US005883192A

United States Patent [19]
Natori et al.

[11] Patent Number: 5,883,192
[45] Date of Patent: Mar. 16, 1999

[54] RESIN COMPOSITION

[75] Inventors: Itaru Natori, Yokohama; Kimio Imaizumi, Kiyose; Kiyoo Kato, Kawasaki, all of Japan

[73] Assignee: Asahi Kasei Kogyo Kabushiki Kaisha, Osaka, Japan

[21] Appl. No.: 663,175

[22] PCT Filed: Nov. 21, 1994

[86] PCT No.: PCT/JP94/01970

§ 371 Date: Jun. 10, 1996

§ 102(e) Date: Jun. 10, 1996

[87] PCT Pub. No.: WO95/21217

PCT Pub. Date: Aug. 10, 1995

[30] Foreign Application Priority Data

Feb. 1, 1994 [JP] Japan .................................. 6-010567

[51] Int. Cl.⁶ .................................................. C08L 53/00
[52] U.S. Cl. ........................... 525/98; 525/96; 525/99; 525/211; 525/216
[58] Field of Search ................................... 525/211, 216, 525/96, 98, 99

[56] References Cited

U.S. PATENT DOCUMENTS

| | | | |
|---|---|---|---|
| 3,624,060 | 11/1971 | Judy ........................................ | 526/122 |
| 3,919,133 | 11/1975 | Dawans .................................... | 525/237 |
| 3,943,116 | 3/1976 | Bell ......................................... | 526/128 |
| 4,020,251 | 4/1977 | Hsieh ........................................ | 526/20 |
| 4,038,471 | 7/1977 | Castner .................................... | 526/142 |
| 4,048,124 | 9/1977 | Ishikawa ................................. | 525/211 |
| 4,051,199 | 9/1977 | Udipi et al. .............................. | 260/880 |
| 4,113,930 | 9/1978 | Moczgyemba .......................... | 526/25 |
| 4,127,710 | 11/1978 | Hsieh ..................................... | 525/332 |
| 4,131,653 | 12/1978 | Hsieh et al. .............................. | 525/99 |
| 4,138,536 | 2/1979 | Hsieh ..................................... | 526/19 |
| 4,179,480 | 12/1979 | Hsieh ..................................... | 260/880 |
| 4,189,410 | 2/1980 | Laurito ................................... | 526/290 |
| 4,237,246 | 12/1980 | Hsieh ..................................... | 526/133 |
| 4,433,100 | 2/1984 | Laurito ................................... | 526/283 |
| 5,239,005 | 8/1993 | Lee ......................................... | 525/211 |
| 5,571,869 | 11/1996 | Lee ......................................... | 525/322 |

FOREIGN PATENT DOCUMENTS 1042625  9/1966  United Kingdom .

OTHER PUBLICATIONS

S. E. Horne, Jr. et al., "Ameripol SN –a cis–1,4–Polyisoprene", *Industrial and Engineering Chemistry*, pp. 784–791, Apr. 1956.

Shen Zhiquan, et al., "The Characteristics of Lanthanide Coordination Catalysts and the cis–Polydienes Prepared Therewith", *Journal of Polymer Science: Polymer Chemistry Edition*, vol. 18, pp. 3345–3357, 1980.

Yang Jihua, et al., "A Higher Active Lanthanide Chloride Catalyst for Stereospecific Polymerization of Conjugated Diene", *Scientia Sinica*, vol. 23, No. 6, pp. 734–743, Jun. 1980.

A. Mazzei, "Synthesis of Polydienes of Controlled Tacticity with New Catalytic Systems", *Makromol. Chem.*, Suppl. 4, pp. 61–72, 1981.

H. L. Hsieh, et al., Polymerization of Butadiene and Isoprene with Lanthanide Catalysts; Characterization and Properties of Homopolymers and Copolymers, *Rubber Chemistry and Technology*, vol. 58, pp. 117–145, Mar.–Apr. 1985.

J. Witte, "Fortschritte Bei Der Homopolymerisation Von Diolefinen Mit Metallorganischen Katalysatoren", *Die Angewandte Makromolekulare Chemie*, vol. 94, pp. 119–146, 1981.

Ji–Hua Yang, et al., "New Binary Lanthanide Catalysts for Stereospecific Diene Polymerization", *Macromolecules*, vol. 15, No. 2, pp. 230–233, Mar.–Apr. 1982.

Bernard Francois et al., "Kinetics of 1,3–Cyclohexadiene Polymerization Initiated by Organolithium Compounds in a Non–Polar Medium, $2^{a)}$", *Makromol. Chem.* vol. 191, pp. 2743–2753, 1990.

C. S. Marvel et al., "Preparation and Aromatization of Poly–1,3–Cyclohexadiene", *The Journal of the American Chemical Society*, vol. 81, pp. 448–453, 1959.

G. Lefebvre et al., "1,3–Cyclohexadiene Polymers. Part I. Preparation and Aromatization of Poly–1,3–Cyclohexadiene", *Journal of Polymer Science Part A*, vol. 2, pp. 3377–3295, 1964.

P. E. Cassidy, et al., "Preparation and Aromatization of Poly–1,3–Cyclohexadiene and Subsequent Crosslinking. III", *Journal of Polymer Science Part A*, vol. 3, pp. 1553–1565, 1965.

(List continued on next page.)

*Primary Examiner*—Paul R. Michl
*Attorney, Agent, or Firm*—Birch, Stewart, Kolasch & Birch, LLP

[57] ABSTRACT

Disclosed is a resin composition comprising ($\alpha$) at least one polymer selected from the group consisting of a non-modified cyclic monomer unit-containing polymer and a modified cyclic monomer unit-containing polymer having a number average molecular weight of from 10,000 to 5,000,000, wherein the cyclic monomer unit is derived from a cyclic conjugated diene, and ($\beta$) at least one polymer other than the polymer ($\alpha$), and wherein the polymer ($\alpha$) is present in an amount of at least 1% by weight, based on the total weight of the polymers ($\alpha$) and ($\beta$). The molecular structure of the polymer ($\alpha$) which is contained in the novel resin composition of the present invention and which is selected from a non-modified cyclic monomer unit-containing polymer and a modified cyclic monomer unit-containing polymer, wherein the cyclic monomer unit is derived from a cyclic conjugated diene, can be controlled with large freedom. Therefore by combining the polymer ($\alpha$) with a polymer ($\beta$) other than the polymer ($\alpha$), a resin composition which is excellent in various properties, such as theremal stability with respect to rigidity, and impact resistance can be provided with large freedom with respect to the choice of its properties.

13 Claims, 4 Drawing Sheets

OTHER PUBLICATIONS

L. A. Mango, et al. "Organometallic Reactions Which Control Molecular Weight in the Anionic Polymerization of 1,3–Cyclohexadiene", *Polymer Preprints*, vol. 12, No. 2, pp. 402–409, Sep. 1971.

L. A. Mango, "Hydrogenation of Unsaturated Polymers with Diimide", *Die Makromolekulare Chemie*, 163, pp. 13–36, 1973.

B. A. Dolgoplosk, et al., "Some Aspects of Copolymerization of Dienes Under the Influence of π Allyl Complexes", *European Polymer Journal*, vol. 9, pp. 895–908, 1973.

Kobunshi Ronbunshu, (Collection of theses concerning Polymers), vol. 34, No. 5, 333–340, 1977.

Z. Sharaby, et al. "Kinetics and Mechanism of the Anionic Polymerization of Cyclohexadienes Initiated by Naphthalene Radical Anions and Dianions", *Journal of Polymer Science: Polymer Chemistry Edition*, vol. 20, pp. 901–915, 1982.

RESIN COMPOSITION

BACKGROUND OF THE INVENTION

1. Technical Field

The present invention relates to a novel resin composition containing a cyclic monomer unit-containing polymer. More particularly, the present invention is concerned with a novel resin composition comprising (α) at least one polymer selected from the group consisting of a non-modified cyclic monomer unit-containing polymer and a modified cyclic monomer unit-containing polymer, wherein the cyclic monomer unit is derived from a cyclic conjugated diene, and (β) at least one polymer other than the polymer (α), which resin composition is excellent in thermal properties, such as thermal stability with respect to rigidity, and mechanical properties, such as impact resistance.

2. Prior Art

In recent years, polymer chemistry has continuously made progress through various innovations in order to meet commercial demands which have been increasingly diversified. Especially in the field of polymer materials to be used as commercially important materials, extensive and intensive studies have been made toward developing polymers having more excellent thermal and mechanical properties. Various proposals have been made with respect to such polymers and methods for the production thereof.

Polymer materials are advantageous in that they have light weight and have a large freedom of selection with respect to the shapes of ultimate molded products, and that a wide variety of unique properties can be exhibited in accordance with the types of polymer materials used. Therefore, polymer materials are used in an extremely wide variety of application fields, such as those for automobile parts, electric and electronic parts, railroad parts, aircraft parts, fibers, clothes, medical equipment parts, packaging materials for drugs and foods and materials for general miscellaneous goods. Further, in accordance with the diversification of commercial demands and the progress of technology, the importance of polymer materials has been increasing by great leaps.

In recent years, due to a rise in the consciousness about environmental problems, with respect to materials to be used in, for example, the fields of automobile parts, electric and electronic parts and the like, a demand for decreasing the number of the types of necessary materials so as to decrease the weight and number of parts, has been rapidly increasing. For the purpose of meeting this demand, energetic researches have been widely conducted on how to replace structural non-polymer materials with polymer materials and how to decrease the number of the types of structural materials.

However, as one of the most important problems which must be solved for developing polymer materials, especially organic polymer materials, which can be widely used as structural materials, there is a problem inherent in conventional polymer materials, namely a problem that polymer materials exhibit a considerably large change in mechanical properties in accordance with changes in ambient temperature.

The reason for the occurrence of the above-mentioned phenomenon with conventional polymer materials is generally presumed to be as follows. When the ambient temperature of a polymer material is elevated to a temperature which is higher than the glass transition temperature (Tg) of the polymer material, the molecular chain of the polymer is changed from a glassy state to a rubbery state, and this change of state becomes a main cause for a considerably larger change in mechanical properties. Therefore, it has, in principle, been impossible to solve this problem insofar as a polymer material having a single molecular structure is used, so that extensive and intensive studies have been made for solving the problem by using a combination of a plurality of different types of polymer materials.

For example, in order to obtain a polymer material having mechanical properties (such as thermal stability with respect to rigidity and mechanical strength, impact resistance and dimensional stability) which are not only improved, but also are unlikely to suffer an unfavorable change at ambient temperatures, it has been attempted to use a polymer material in combination with other polymers, which are different from the polymer material in glass transition temperature (Tg), to obtain composite polymer materials, or to copolymerize a plurality of types of monomers to thereby produce a polymer material comprising a copolymer chain having segments which are different in glass transition temperature.

Examples of such conventional techniques include:

a method in which a polymer, which has a relatively high melting temperature (Tm) but does not have a satisfactorily high Tg [such as a polyamide (PA), a polyester (PEs), a polyphenylene sulfide (PPS), a polyacetal (e.g., a polyoxymethylene, that is, POM) or a polypropylene (PP)], is used in combination with another type of polymer which has a relatively high Tg [such as a polyphenylene ether (PPE), a polycarbonate (PC), a polyarylate (PAR), a polysulfone (PSF), a polyether ketone (PEK), a polyether ether ketone (PEEK), a liquid crystal polyester (LCP) or a polystyrene (PSt)], to thereby obtain a polymer material having an improved thermal stability with respect to rigidity;

a method in which a polymer which does not have a satisfactorily low Tg [such as a polyamide (PA), a polyester (PEs), a polyphenylene sulfide (PPS), a polyacetal (e.g., a polyoxymethylene, that is, POM), a polypropylene (PP), a polyphenylene ether (PPE) or a polystyrene (PSt)], is used in combination with a polymer which has a relatively low Tg [such as an ethylene-propylene rubber (EPR), an ethylene-propylene-diene terpolymer (EPDM), a styrene-butadiene rubber (SBR), a hydrogenated styrene-butadiene rubber (styrene-ethylene-butylene-styrene, that is, SEBS), a styrene-isoprene rubber (SIR), a hydrogenated styrene-isoprene rubber, a butadiene rubber (BR), an isoprene rubber (IR), a chloroprene rubber (CR), a nitrile rubber (acrylonitrile-butadiene rubber, that is, NBR), an ethylene-containing ionomer, an acrylic rubber, a silicone rubber, a fluororubber, a polyamide elastomer or a polyester elastomer], to thereby obtain a polymer material having an improved impact resistance;

a method in which a polymer, such as a polystyrene (PSt), a styrene-butadiene rubber (SBR), a hydrogenated styrene-butadiene rubber (SEBS), a styrene-isoprene rubber (SIR), a hydrogenated styrene-isoprene rubber, ABS resin or AES resin, is used in combination with a polymer having a relatively high Tg, to thereby obtain a polymer material having an improved thermal stability with respect to mechanical strength; and a method in which an aromatic or aliphatic cyclic monomer unit is introduced, by copolymerization, into the molecular chain of a polymer, such as a polyamide (PA), a polyester (PEs), a polypropylene (PP) or a polyethylene (PE), to thereby obtain a polymer material having an improved thermal stability with respect to rigidity, mechanical strength and the like. Of these known methods, several methods have already been commercially practiced.

However, in these conventional techniques, it is necessary that the respective types of different polymers to be used in combination or the respective types of a monomer and a comonomer to be used in combination be largely varied depending on the properties to be improved. Therefore, these conventional methods are not always in line with the market trend that it is desired to decrease the number of the types of structural materials.

As a solution to this problem, a (hydrogenated) conjugated diene polymer has been proposed. A conjugated diene polymer can be produced by living anionic polymerization, so that a conjugated diene polymer has a large freedom with respect to the designing of the molecular chain and it is relatively easy to control the properties of a conjugated diene polymer to be obtained, for example, by copolymerization. Therefore, it is conceivable that, when a conjugated diene polymer having properties appropriately controlled, e.g., by copolymerization, is used as a modifier for a polymer material, various properties, such as thermal stability with respect to rigidity and mechanical strength, impact strength and dimensional stability, can be imparted to the polymer material with a large freedom. Hence, researches have been intensively conducted for development of conjugated diene polymers as a representative modifier component for composite resin materials.

Representative examples of known conjugated diene polymers include homopolymers, such as a polybutadiene and a polyisoprene; copolymers of block, graft, taper and random configurations, such as a butadiene-isoprene copolymer, a styrene-butadiene copolymer, a propylene-butadiene copolymer, a styrene-isoprene copolymer, an α-methylstyrene-butadiene copolymer, an α-methylstyrene-isoprene copolymer, an acrylonitrile-butadiene copolymer, an acrylonitrile-isoprene copolymer, a butadiene-methyl methacrylate copolymer and an isoprene-methyl methacrylate copolymer; and hydrogenated polymers derived therefrom. These polymers have been used for various purposes in various fields. For example, in combination with other polymers, these conventional conjugated diene polymers have been used as plastics; elastomers; fibers; sheets; films; materials for parts for machines, containers for food, packing materials, tires and belts; insulating materials; adhesives; and the like.

For example, in the field of thermoplastic elastomers, when a conjugated diene polymer in the form of a thermoplastic elastomer is used as a modifier for improving the impact resistance of a polymer material, a conjugated diene block copolymer has conventionally been used which comprises a polymer chain composed of an agglomeration phase which is of a polymer block having a Tg (glass transition temperature) higher than room temperature, and an elastomer phase which is of a polymer block having a Tg lower than room temperature.

Representative examples of such block copolymers include a styrene-butadiene (isoprene)-styrene block copolymer and a hydrogenated product thereof.

Further, for improving various properties (such as thermal resistance, fluidity and adhesion properties) of the styrene-butadiene (isoprene)-styrene block copolymer or a hydrogenated product thereof, it has been widely practiced to use the block copolymer or a hydrogenated product thereof in the form of a block copolymer composition which is obtained by blending the above-mentioned block copolymer or a hydrogenated product thereof with another polymer, such as a polystyrene, a polyolefin, a polyphenylene ether or a styrene-butadiene diblock copolymer, or a hydrogenated product thereof.

On the other hand, various proposals have been made with respect to the method for producing a conjugated diene polymer, which is also very important from a commercial point of view.

Particularly, various studies have been made with a view toward developing a polymerization catalyst capable of providing conjugated diene polymers having a high cis-1, 4-bond content, for the purpose of obtaining conjugated diene polymers having improved thermal and mechanical properties.

For example, a catalyst system comprised mainly of a compound of an alkali metal, such as lithium or sodium, and a composite catalyst system comprised mainly of a compound of a transition metal, such as nickel, cobalt or titanium, have been proposed. Some of these catalyst systems have already been employed for a commercial scale practice of the polymerization of butadiene,. isoprene and the like (see, for example, Ind. Eng. Chem., 48, 784 (1956) and Examined Japanese Patent Application Publication No. 37-8193).

On the other hand, for not only obtaining a conjugated diene polymer having a further increased cis-1,4-bond content but also providing a catalyst having a further improved polymerization activity, a number of studies have been made toward developing a composite catalyst system comprising a rare earth metal compound and an organometallic compound containing a metal belonging to Group I, II or III of the Periodic Table. Further, in connection with the study of such a catalyst system, intensive studies have also been made with respect to highly stereospecific polymerization [see, for example, J. Polym. Sci., Polym. Chem. Ed., 18, 3345 (1980); Sci, Sinica., 2/3, 734 (1980); Makromol. Chem. Suppl, 4, 61 (1981); German Patent Application No. 2,848,964; Rubber Chem. Technol., 58, 117 (1985)].

Among these composite catalyst systems, a composite catalyst comprised mainly of a neodymium compound and an organoaluminum compound has been confirmed to have not only the ability to provide a desired polymer having a high cis-1,4-bond content, but also exhibits an excellent polymerization activity. Accordingly, this type of composite catalyst has already been commercially used as a catalyst for the polymerization of butadiene or the like [see, for example, Agnew, Makromol. Chem., 94, 119 (1981); Macromolecules, 15, 230 (1982)].

However, in accordance with the recent remarkable progress of the techniques in this field, there has been a strong demand for the development of polymer materials having further improved properties, particularly excellent thermal properties (such as melting temperature, glass transition temperature and heat distortion temperature) and excellent mechanical properties (such as tensile modulus and flexural modulus).

As one of the most practical means for meeting such a demand, it has been attempted to develop a technique of improving the structures of the main molecular chains of polymers of conjugated diene monomers (in homopolymerizing or copolymerizing not only a monomer having a relatively small steric hindrance, e.g., butadiene or isoprene, but also a monomer having a large steric hindrance, e.g., a cyclic conjugated diene monomer, and, optionally, hydrogenating the resultant conjugated diene polymer, thereby forming a cyclic olefin monomer unit in the molecular chain) so as to obtain conjugated diene polymers having excellent thermal properties (such as thermal stability with respect to rigidity and mechanical strength), excellent impact resistance and excellent dimensional stability. Further, it has also been attempted to use these conjugated diene polymers in combination with other polymers so as to obtain composite resin materials having improved properties.

With respect to the homopolymerization or copolymerization of a monomer having a relatively small steric hindrance, e.g., butadiene or isoprene, catalyst systems having a polymerization activity which is satisfactory to a certain extent have been successfully developed. However, a catalyst system which exhibits a satisfactory polymerization activity in the homopolymerization or copolymerization of monomers having a large steric hindrance, e.g., a cyclic conjugated diene monomer, has not yet been developed.

That is, by conventional techniques, even homopolymerization of a cyclic conjugated diene is difficult, so that a homopolymer having a desired high molecular weight cannot be obtained. Furthermore, an attempt to copolymerize a cyclic conjugated diene with a monomer other than the cyclic conjugated diene, for the purpose of obtaining a polymer having optimized thermal and mechanical properties in order to meet a wide variety of commercial needs, has been unsuccessful with the result that the products obtained are only oligomers having a low molecular weight.

Further, the carbon—carbon double bond in a cyclic conjugated diene monomer unit of a conjugated diene polymer has a large steric hindrance. Due to this, in conventional techniques, there is a serious problem in that when it is attempted to introduce a cyclic olefin monomer unit into the molecular chain of a conjugated diene polymer by a hydrogenation reaction, the rate of the hydrogenation reaction is considerably low, so that it is extremely difficult to introduce a cyclic olefin monomer unit into the conjugated diene polymer.

As is apparent from the above, in any of the conventional techniques, it has been impossible to obtain an excellent polymer containing a cyclic conjugated diene monomer unit and/or a cyclic olefin monomer unit, which polymer can satisfy commercial demand. Therefore, it has been strongly desired to develop excellent polymers containing a cyclic monomer unit.

J. Am. Chem. Soc., 81, 448 (1959) discloses a cyclohexadiene homopolymer and a polymerization method therefor, which homopolymer is obtained by polymerizing 1,3-cyclohexadiene (a typical example of a cyclic conjugated diene monomer), using a composite catalyst comprised of titanium tetrachloride and triisobutylaluminum.

However, the polymerization method disclosed in this prior art document is disadvantageous in that the use of a large amount of the catalyst is necessary, and the polymerization reaction must be conducted for a prolonged period of time, and that the obtained polymer has only an extremely low molecular weight. Therefore, the polymer obtained by the technique of this prior art document is of no commercial value.

Further, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

J. Polym. Sci., Pt. A, 2, 3277 (1964) discloses methods for producing a cyclohexadiene homopolymer, in which the polymerization of 1,3-cyclohexadiene is conducted by various polymerization methods, such as radical polymerization, cationic polymerization, anionic polymerization and coordination polymerization.

However, in all of the methods disclosed in this prior art document, the polymers obtained have an extremely low molecular weight. Therefore, the polymers obtained by the techniques of this prior art document are of no commercial value. Further, this prior art document has no teaching or suggestion of a method for introducing a cyclic olefin monomer unit into the polymeric molecular chain of a polymer to obtain a new polymer and use of such a new polymer containing a cyclic olefin monomer unit as a component for providing a composite resin material.

British Patent Application No. 1,042,625 discloses a method for producing a cyclohexadiene homopolymer, in which the polymerization of 1,3-cyclohexadiene is conducted using a large amount of an organolithium compound as a catalyst.

In the polymerization method disclosed in British Patent Application No. 1,042,625, the catalyst must be used in an amount as large as 1 to 2 wt %, based on the total weight of the monomers. Therefore, this method is economically disadvantageous. Further, the polymer obtained by this method has only an extremely low molecular weight.

Moreover, the method of this prior art document has disadvantages in that the polymer obtained contains a large amount of catalyst residue, which is very difficult to remove from the polymer, so that the polymer obtained by this method is of no commercial value.

Furthermore, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

J. Polym. Sci., Pt. A, 3, 1553 (1965) discloses a cyclohexadiene homopolymer, which is obtained by polymerizing 1,3-cyclohexadiene using an organolithium compound as a catalyst. In this prior art document, the polymerization reaction must be continued for a period as long as 5 weeks, however, the polymer obtained has a number average molecular weight of only 20,000 or less.

Further, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

Polym. Prepr. (Amer. Chem. Soc., Div. Polym. Chem.) 12, 402 (1971) teaches that when the polymerization of 1,3-cyclohexadiene is conducted using an organolithium compound as a catalyst, the upper limit of the number average molecular weight of the cyclohexadiene homopolymer obtained is only from 10,000 to 15,000. Further, this document teaches that the reason for such a small molecular weight resides in that, concurrently with the polymerization reaction, not only does a transfer reaction occur, which is caused by the abstraction of a lithium cation present in the polymer terminal, but also a lithium hydride elimination reaction occurs.

Furthermore, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

Die Makromolekulare Chemie., 163, 13 (1973) discloses a cyclohexadiene homopolymer which is obtained by polymerizing 1,3-cyclohexadiene using a large amount of an organolithium compound as a catalyst. However, the polymer obtained in this prior art document is an oligomer having a number average molecular weight of only 6,500.

Further, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

European Polymer J., 9, 895 (1973) discloses a copolymer which is obtained by copolymerizing 1,3-cyclohexadiene with butadiene and/or isoprene, using a π-allylnickel compound as a polymerization catalyst.

However, the polymer obtained in this prior art document is an oligomer having an extremely low molecular weight. Further, it has been reported that the polymer of this prior art document has a single glass transition temperature, which suggests that the polymer has a random copolymer structure.

Further, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

Kobunshi Ronbun-shu (Collection of theses concerning polymers), Vol. 34, No. 5, 333 (1977) discloses a method for synthesizing an alternating copolymer of 1,3-cyclohexadiene and acrylonitrile using zinc chloride as a polymerization catalyst. However, the alternating copolymer obtained in this prior art document is an oligomer having an extremely low molecular weight.

Further, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

J. Polym. Sci., Polym. Chem. Ed., 20, 901 (1982) discloses a cyclohexadiene homopolymer which is obtained by polymerizing 1,3-cyclohexadiene using an organosodium compound as a catalyst. In this prior art document, the organosodium compound used is sodium naphthalene, and a radical anion derived from sodium naphthalene forms a dianion which functions as a polymerization initiation site.

This means that although the cyclohexadiene homopolymer reported in this document has an apparent number average molecular weight of 38,700, this homopolymer is actually only a combination of two polymeric molecular chains, each having a number average molecular weight of 19,350, which chains respectively extend from the polymerization initiation site in two different directions.

Further, in the polymerization method disclosed in this document, the polymerization reaction needs to be conducted at an extremely low temperature. Therefore, the technique of this prior art document is of no commercial value.

Furthermore, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

Makromol. Chem., 191, 2743 (1990) discloses a method for polymerizing 1,3-cyclohexadiene using a polystyryllithium as a polymerization initiator. In this prior art document, it is described that concurrently with the polymerization reaction, not only a transfer reaction, which is caused by the abstraction of a lithium cation present in the polymer terminal, but also a lithium hydride elimination reaction vigorously occurs. Further, it is reported that even though the polymerization is conducted using a polystyryllithium as a polymerization initiator, a styrene-cyclohexadiene block copolymer cannot be obtained at room temperature, but the product obtained is only a cyclohexadiene homopolymer having a low molecular weight.

Further, neither a block copolymer of cyclohexadiene and a chain conjugated diene monomer, nor a multiblock copolymer which is an at least-tri-block copolymer containing a cyclohexadiene polymer block, nor a radial block copolymer containing a cyclohexadiene polymer block is taught or suggested in this prior art document.

Furthermore, this prior art document has no teaching or suggestion of a method for introducing a cyclic olefin monomer unit into the main molecular chain of a polymer to obtain a new polymer and use of such a new polymer containing a cyclic olefin monomer unit as a component for providing a composite resin material.

As can be easily understood from the above, in any of the conventional techniques, it has been impossible to obtain a polymer containing a monomer unit derived from a cyclic conjugated diene monomer and an excellent resin composition containing such a polymer, which polymer and resin composition can be satisfactorily used as industrial materials.

SUMMARY OF THE INVENTION

In these situations, the present inventors previously made extensive and intensive studies with a view toward developing a novel cyclic conjugated diene polymer comprising at least one type of cyclic conjugated diene monomer unit, or comprising at least one type of cyclic conjugated diene monomer unit and a monomer unit derived from at least one type of monomer other than the above-mentioned cyclic conjugated diene monomer, which other monomer is copolymerizable with the cyclic conjugated diene monomer, and wherein the cyclic conjugated diene polymer has a high number average molecular weight, so that it has not only excellent thermal properties in respect of, for example, a melting temperature, a glass transition temperature and a heat distortion temperature, but also excellent mechanical properties, such as high tensile modulus and high flexural modulus, and a method for producing such an excellent cyclic conjugated diene polymer. As a result, the present inventors have successfully developed a novel polymerization catalyst useful for the production of such a polymer as mentioned above, which catalyst has an excellent catalytic activity for not only achieving a desired high polymerization degree, but also effectively and efficiently performing a living anionic polymerization which enables block copolymerization of a cyclic conjugated diene monomer and at least one type of comonomer which is copolymerizable with the cyclic conjugated diene monomer. With such a novel polymerization catalyst, it has for the first time become possible to synthesize a novel cyclic conjugated diene polymer, which has never been reported. In addition, a technique to obtain a cyclic conjugated diene polymer, in which monomer units derived from cyclic conjugated diene monomers are introduced, in a desired proportion and in a desired configuration, as a part of or all of the monomer units constituting a main chain of the polymer, has been developed (see PCT/JP94/00822). In addition, the present inventors have made further studies and, as a result, have developed a technique to provide a polymer containing a saturated cyclic monomer unit, which polymer is derived from the above-mentioned cyclic conjugated diene polymer (see PCT/JP94/00973).

The present inventors have made still further studies. As a result, the present inventors have found that, by combining the above-mentioned cyclic monomer unit-containing polymer derived from a cyclic conjugated diene and at least one polymer other than the cyclic monomer unit-containing polymer, it is possible to provide a resin composition which is improved, with large freedom, with respect to thermal and mechanical properties, such as thermal stability with respect to rigidity, and impact resistance. The present invention has been completed, based on this novel finding.

Accordingly, it is a primary object of the present invention to provide a novel resin composition comprising at least one polymer selected from the group consisting of a non-modified cyclic monomer unit-containing polymer and a modified cyclic monomer unit-containing polymer, wherein the cyclic monomer unit is derived from a cyclic conjugated diene, and at least one polymer other than the above-mentioned polymer derived from a cyclic conjugated diene, which resin composition has advantages such that not only does the resin composition have excellent thermal stability with respect to rigidity and mechanical properties, such as, impact strength, but also, the thermal and mechanical properties of the resin composition can be arbitrarily altered with large freedom.

The foregoing and other objects, features and advantages of the present invention will be apparent from the following detailed description and claims, taken in connection with the accompanying drawings.

DETAILED DESCRIPTION OF THE INVENTION

Figure 1:
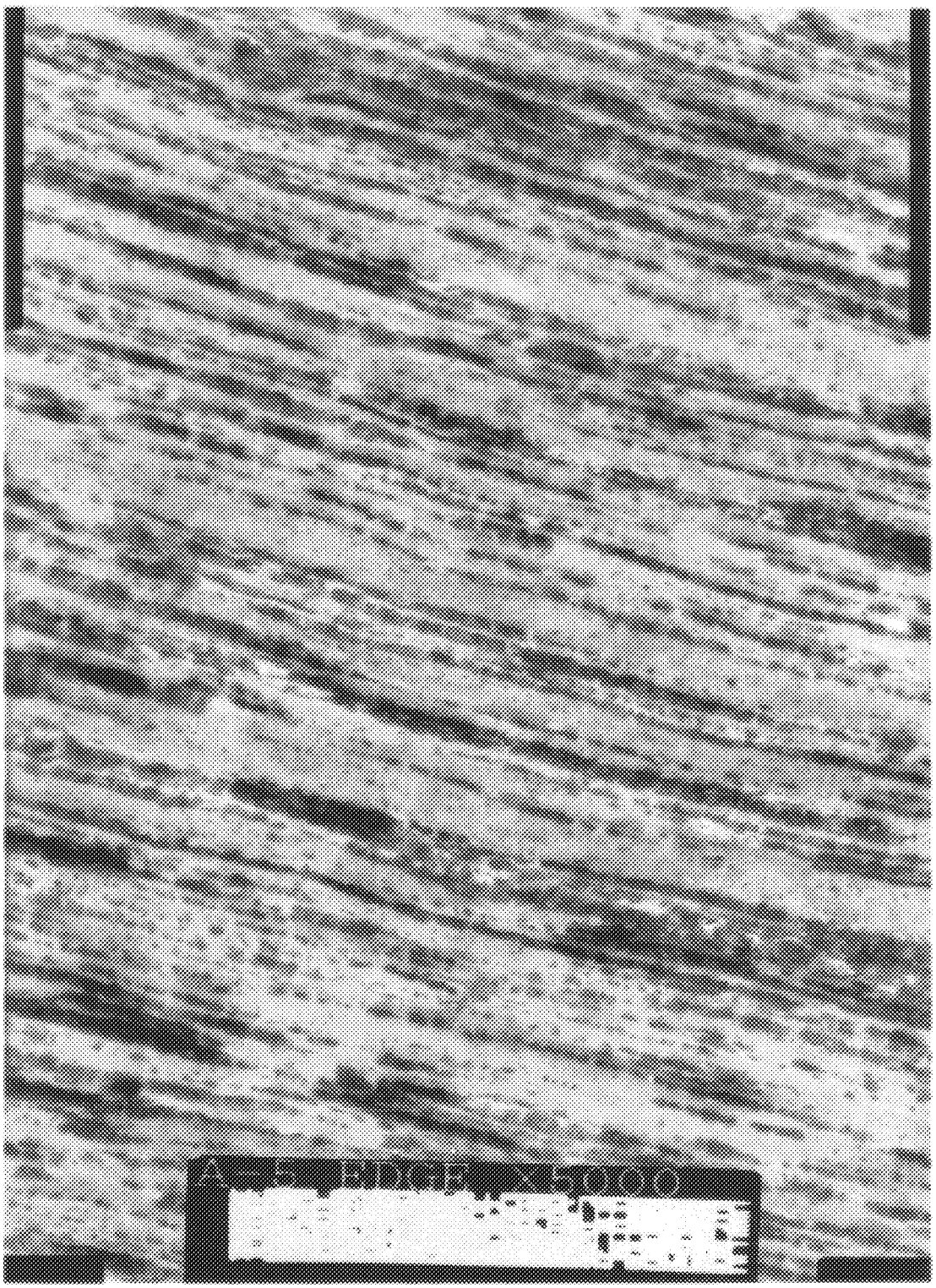
FIG. 1 is a transmission electron microscope (TEM) photomicrograph (×5000) of the resin composition of the present invention, obtained in Example 3.

In the present invention, there is provided a resin composition comprising:

(α) at least one polymer selected from the group consisting of a non-modified cyclic monomer unit-containing polymer (1) and a modified cyclic monomer unit-containing polymer (1'), the polymer (1) and the polymer (1') being, respectively, represented by the following formulae (1) and (1'):

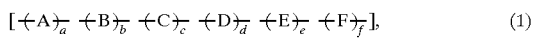  (1)

and

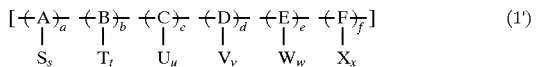  (1')

wherein A to F are monomer units constituting a main chain of each of the polymers (1) and (1'), in which monomer units A to F are arranged in any order, and a to f are, respectively, weight percentages of monomer units A to F, based on the total weight of monomer units A to F;

wherein:
each A is independently selected from the group consisting of cyclic olefin monomer units,
each B is independently selected from the group consisting of cyclic conjugated diene monomer units,
each C is independently selected from the group consisting of chain conjugated diene monomer units,
each D is independently selected from the group consisting of vinyl aromatic monomer units,
each E is independently selected from the group consisting of polar monomer units, and
each F is independently selected from the group consisting of an ethylene monomer unit and α-olefin monomer units;

wherein:
a to f satisfy the following requirements:
$a+b+c+d+e+f=100$,
$0 \leq a, b \leq 100$,
$0 \leq c, d, e, f \leq 100$, and
$a+b \neq 0$;

wherein each of S to X, which are modifying groups and which are the same or different, is independently a functional group or an organic compound residue containing the functional group, the functional group containing at least one member selected from the group consisting of oxygen, nitrogen, sulfur, silicon, phosphorus and halogen, including fluorine, chlorine, bromine and iodine; and wherein s to x are, respectively, weight percentages of modifying groups S to X, based on the weight of the polymer (1'), and satisfy the following requirements:
$0 < s+t+u+v+w+x < 100$, and
$0 \leq s, t, u, v, w, x < 100$, the polymer (α) having a number average molecular weight of from 10,000 to 5,000,000, and (β) at least one polymer other than the polymer (α), the polymer (α) being present in an amount of at least 1% by weight, based on the total weight of the polymer (α) and the polymer (β).

For an easy understanding of the present invention, the essential features and various embodiments of the present invention are enumerated below.

1. A resin composition comprising:
(α) at least one polymer selected from the group consisting of a non-modified cyclic monomer unit-containing polymer (1) and a modified cyclic monomer unit-containing polymer (1'), the polymer (1) and the polymer (1') being, respectively, represented by the following formulae (1) and (1'):

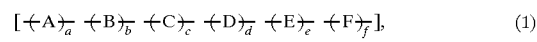  (1)

and

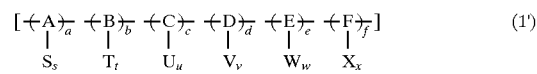  (1')

wherein A to F are monomer units constituting a main chain of each of the polymers (1) and (1'), in which monomer units A to F are arranged in any order, and a to f are, respectively, weight percentages of monomer units A to F, based on the total weight of monomer units A to F;

wherein:
each A is independently selected from the group consisting of cyclic olefin monomer units, each B is independently selected from the group consisting of cyclic conjugated diene monomer units, each C is independently selected from the group consisting of chain conjugated diene monomer units, each D is independently selected from the group consisting of vinyl aromatic monomer units, each E is independently selected from the group consisting of polar monomer units, and each F is independently selected from the group consisting of an ethylene monomer unit and α-olefin monomer units;

wherein:

a to f satisfy the following requirements:
a+b+c+d+e+f=100,
0≦a, b≦100,
0≦c, d, e, f<100, and
a+b≠0;

wherein each of S to X, which are modifying groups and which are the same or different, is independently a functional group or an organic compound residue containing the functional group, the functional group containing at least one member selected from the group consisting of oxygen, nitrogen, sulfur, silicon, phosphorus and halogen, including fluorine, chlorine, bromine and iodine; and wherein s to x are, respectively, weight percentages of modifying groups S to X, based on the weight of the polymer (1'), and satisfy the following requirements:
0<s+t+u+v+w+x<100, and
0≦s, t, u, v, w, x<100, the polymer (α) having a number average molecular weight of from 10,000 to 5,000,000, and (β) at least one polymer other than the polymer (α), the polymer (α) being present in an amount of at least 1% by weight, based on the total weight of the polymer (α) and the polymer (β).

2. The resin composition according to item 1 above, wherein, in at least one formula of (1) and (1'), a=100.

3. The resin composition according to item 1 above, wherein, in at least one formula of (1) and (1'), b=100.

4. The resin composition according to item 1 above, wherein, in at least one formula of (1) and (1'), a+b=100 and a>0.

5. The resin composition according to item 1 above, wherein, in at least one formula of (1) and (1'), 0<a+b<100.

6. The resin composition according to item 1 above, wherein, in at least one formula of (1) and (1'), the main chain has a random copolymer configuration.

7. The resin composition according to item 1 above, wherein, in at least one formula of (1) and (1'), the main chain has an alternating copolymer configuration.

8. The resin composition according to item 1 above, wherein, in at least one formula of (1) and (1'), the main chain has a block copolymer configuration, in which the block copolymer has at least one polymer block containing at least one monomer unit selected from the group consisting of the A monomer unit and the B monomer unit.

9. The resin composition according to item 1 above, wherein, in at least one formula of (1) and (1'), the main chain has a block copolymer configuration, in which the block copolymer has at least one polymer block consisting of at least one A monomer unit and at least one B monomer unit.

10. The resin composition according to item 1 above, wherein, in at least one formula of (1) and (1'), the main chain has a block copolymer configuration, in which the block copolymer has at least one polymer block consisting of A monomer units.

11. The resin composition according to item 1 above, wherein, in at least one formula of (1) and (1'), the main chain has a block copolymer configuration, in which the block copolymer has at least one polymer block consisting of B monomer units.

12. The resin composition according to any one of items 1 to 11 above, wherein, in at least one formula of (1) and (1'), the A monomer unit is selected from the group consisting of cyclic olefin monomer units represented by the following formula (2):

wherein each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and x is an integer of from 1 to 4, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, or each $R^2$ independently represents a bond or a group such that two $R^2$ groups together form a bridge represented by the formula $-(CR_2^3)_y-$ in which $R^3$ has the same meaning as defined for $R^1$ and y is an integer of from 1 to 10, and wherein, in at least one formula of (1) and (1'), the B monomer unit is selected from the group consisting of cyclic conjugated diene monomer units represented by the following formula (3):

wherein each of $R^1$, $R^2$ and x is as defined for formula (2).

13. The polymer according to item 12 above, wherein, in at least one formula of (1) and (1'), the A monomer unit is selected from the group consisting of cyclic olefin monomer units represented by the following formula (4):

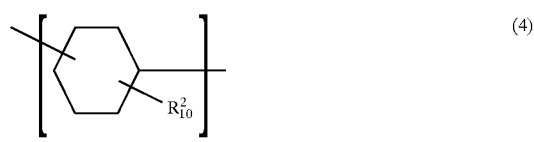

wherein each $R^2$ is as defined for formula (2), and wherein, in at least one formula of (1) and (1'), the B monomer unit is selected from the group consisting of cyclic conjugated diene monomer units represented by the following formula (5):

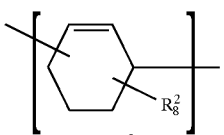

wherein each $R^2$ is as defined for formula (2).

14. The resin composition according to any one of items 1 to 11 above, wherein each of S to X is independently a functional group or an organic compound residue containing the functional group, the functional group being at least one member selected from the group consisting of a hydroxyl group, an ether group, an epoxy group, a carboxylic acid group, an ester group, a carboxylate group, an acid anhydride group, an acid halide group, an aldehyde group, a carbonyl group, an amino group, an amido group, an imido group, an imino group, an oxazoline group, a hydrazine group, a hydrazido group, an amidine group, a nitrile group, a nitro group, an isocyano group, a cyanato group, an isocynato group, a silyl group, a silyl ester group, a silyl ether group, a silanol group, a thiol group, a sulfide group, a thiocarboxylic acid group, a dithiocarboxylic acid group, a sulfonic acid group, a sulfinic acid group, a sulfenic acid group, a thiocyanato group, an isothiocyanato group, a thioaldehydo group, a thioketone group, a phosphoric acid group, a phosphonic acid group and a phosphinic acid group.

15. The resin composition according to any one of items 1 to 13 above, wherein each of S to X is independently a functional group or an organic compound residue containing the functional group, the functional group being at least one member selected from the group consisting of a hydroxyl group, an epoxy group, a carboxylic acid group, an ester group, a carboxylate group, an acid anhydride group, an amino group, an amido group, an imido group, an imino group, an oxazoline group, a hydrazine group, a hydrazido group, an isocyano group, a cyanato group, an isocyanato group, a silyl group, a silyl ester group, a silyl ether group, a silanol group, a thiol group, a sulfide group, a thiocarboxylic acid group and a sulfonic acid group.

16. The resin composition according to any one of items 1 to 11 above, wherein the polymer (β) is a thermoplastic resin.

17. The resin composition according to any one of items 1 to 11 above, wherein the polymer (β) is a curable resin.

18. The resin composition according to item 16 above, wherein the thermoplastic resin is at least one polymer selected from the group consisting of an olefin polymer, a styrene polymer, a conjugated diene polymer, a hydrogenated conjugated diene polymer, a (meth)acrylate polymer, a (meth)acrylonitrile polymer, a halogenated vinyl polymer, an ester polymer, an ether polymer, an amide polymer, an imide polymer, a sulfide polymer, a sulfone polymer and a ketone polymer.

19. The resin composition according to item 16 above, wherein the thermoplastic resin is at least one polymer selected from the group consisting of an olefin polymer, a styrene polymer, a conjugated diene polymer, a hydrogenated conjugated diene polymer, an ester polymer, an ether polymer, an amide polymer and a sulfide polymer.

20. The resin composition according to any one of items 1 to 11 above, wherein the polymer (α) comprises the modified cyclic monomer unit-containing polymer (1'), wherein at least one modifying group of S to X is a functional group or an organic compound residue containing the functional group, the functional group being selected from the group consisting of a hydroxyl group, an epoxy group, a carboxylic acid group, an ester group, a carboxylate group, an acid anhydride group, an amino group, an amido group, an imido group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic acid group;

wherein the polymer (β) comprises at least one polymer selected from the group consisting of an ester polymer containing at least one functional group selected from the group consisting of a hydroxyl group, a carboxyl group and an ester group, an ether polymer containing at least one functional group selected from the group consisting of a hydroxyl group and an ether group, an amide polymer containing at least one functional group selected from the group consisting of an amino group, a carboxyl group and an amido group, and a sulfide polymer containing at least one functional group selected from the group consisting of a thiol group and a sulfide group; and wherein the resin composition comprises 0.001 to 100% by weight, based on the weight of the resin composition, of a reaction product of the polymer (α) with the polymer (β), wherein the reaction product is formed by the reaction of the at least one functional group or organic compound residue of the polymer (α) with the at least one functional group of the polymer (β).

21. The resin composition according to any one of items 1 to 11 above, wherein the polymer (α) comprises the modified cyclic monomer unit-containing polymer (1'), wherein at least one modifying group of S to X is a functional group or an organic compound residue containing the functional group, the functional group being selected from the group consisting of a hydroxyl group, an epoxy group, a carboxylic acid group, an ester group, a carboxylate group, an acid anhydride group, an amino group, an amido group, an imido group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic acid group;

wherein the polymer (β) comprises at least one modified polymer selected from the group consisting of a modified olefin polymer, a modified styrene polymer, a modified conjugated diene polymer, a modified hydrogenated conjugated diene polymer, a modified ether polymer and a modified sulfide polymer, the at least one modified polymer having at least one functional group or organic compound residue containing the functional group, wherein the functional group is selected from the group consisting of a hydroxyl group, an epoxy group, a carboxylic acid group, an ester group, a carboxylate group, an acid anhydride group, an amino group, an amido group, an imido group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic acid group; and wherein the resin composition comprises 0.001 to 100% by weight, based on the weight of the resin composition, of a reaction product of the polymer (α) with the polymer (β), wherein the reaction product is formed by the reaction of the at least one functional group or organic compound residue of the polymer (α) with the at least one functional group or organic compound residue of the polymer (β).

22. The resin composition according to item 16 above, wherein the thermoplastic resin is an olefin polymer having an intrinsic viscosity of from 0.1 to 100 (liter/g) as measured at 135° C. in decalin.

23. The resin composition according to item 16 above, wherein the thermoplastic resin is an amide polymer having an intrinsic viscosity of from 0.1 to 100 (liter/g) as measured at 25° C. in 96% $H_2SO_4$.

24. The resin composition according to item 16 above, wherein the thermoplastic resin is at least one olefin polymer selected from the group consisting of an ethylene homopolymer, an α-olefin homopolymer and a copolymer of ethylene with an α-olefin.

25. The resin composition according to item 16 above, wherein the thermoplastic resin is a crystalline polyamide which is obtained by polymerizing at least one member selected from the group consisting of a reaction product of a diamine with a dicarboxylic acid, a lactam and an amino acid.

In the present invention, the monomer units of the polymer are named in accordance with a nomenclature such that the names of the original monomers from which the monomer units are derived, as such, are used with the term "unit" being attached thereto. For example, the term "cyclic olefin monomer unit" means a monomer unit which is formed in a polymer obtained by the polymerization of a cyclic olefin monomer and which has a molecular structure such that a cycloalkane corresponding to the cyclic olefin monomer is bonded at two carbon atoms of a skeleton thereof. Further, the term "cyclic conjugated diene monomer unit" means a monomer unit which is formed in a polymer obtained by the polymerization of a cyclic conjugated diene monomer and which has a molecular structure such that a cycloolefin corresponding to the cyclic conjugated diene monomer is bonded at two carbon atoms of a skeleton thereof.

In the present invention, at least one polymer selected from the group consisting of the non-modified cyclic monomer unit-containing polymer (1) and the modified cyclic monomer unit-containing polymer (1') can be used as the polymer (α). Each of polymers (1) and (11) comprises a main chain which is comprised partly or entirely of a cyclic olefin monomer unit and/or a cyclic conjugated diene monomer unit, and polymers (1) and (1') are, respectively, represented by the following formula (1) and (11).

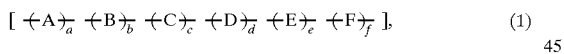
(1)

and

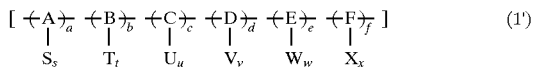
(1')

wherein A to F, a to f, S to X and s to x are as defined above.

In the present invention, with respect to each of monomer units A to F in the formula (1) or (1'), when a plurality of monomer units are contained in a main chain of the polymer, the monomer units may be the same or different.

In the present invention, it is preferred that each of the non-modified cyclic monomer unit-containing polymer (1) and the modified cyclic monomer unit-containing polymer (1') be a polymer comprising a main chain which is comprised partly or entirely of 5 to 8-membered cyclic olefin monomer units and/or 5 to 8-membered cyclic conjugated diene monomer units, wherein the monomer units are bonded by a 1,2-bond and/or a 1,4-bond.

In the present invention, it is preferred that the polymer (α) have a ratio of the 1,2-bond to the 1,4-bond of from 99/1 to 1/99, more preferably from 90/10 to 10/90.

In the present invention, the cyclic olefin monomer unit is at least one member selected from cyclic olefin monomer units having a carbocyclic structure. It is preferred that the cyclic olefin monomer unit be at least one member selected from cyclic olefin monomer units having a 5 to 8-membered carbocyclic structure. It is especially preferred that the cyclic olefin monomer unit be at least one member selected from cyclic olefin monomer units having a 6-membered carbocyclic structure.

Examples of cyclic olefin monomer units include units of cyclopentane, cyclohexane, cyclooctane and derivatives thereof. Of these, units of cyclohexane and derivatives thereof are especially preferred.

It is preferred that the cyclic olefin monomer unit be a molecular unit represented by the following formula (2):

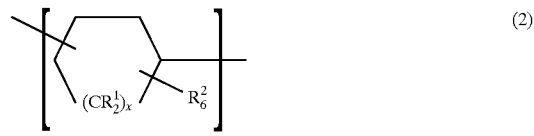
(2)

wherein each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and x is an integer of from 1 to 4, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group, or a 5 to 10-membered heterocyclic group having at least one nitrogen, oxygen or sulfur atom as a heteroatom, or each $R^2$ independently represents a bond or a group such that two $R^2$ groups together form a bridge represented by formula $-(CR_2^3)_y-$ in which $R^3$ has the same meaning as defined for $R^1$ and y is an integer of from 1 to 10.

It is most preferred that the cyclic olefin monomer unit be a molecular unit represented by the following formula (4):

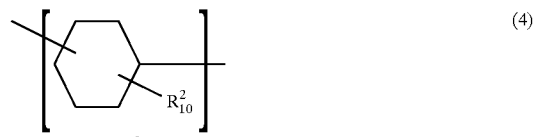
(4)

wherein each $R^2$ is as defined for formula (2).

In the present invention, the cyclic conjugated diene monomer unit is at least one member selected from cyclic conjugated diene monomer units having a carbocyclic structure. It is preferred that the cyclic conjugated diene monomer unit be at least one member selected from cyclic conjugated diene monomer units having a 5 to 8-membered carbocyclic structure. It is especially preferred that the cyclic conjugated diene monomer unit be at least one member selected from cyclic conjugated diene monomer units having a 6-membered carbocyclic structure.

Examples of cyclic conjugated diene monomer units include units of cyclopentene, cyclohexene, cyclooctene and derivatives thereof. Of these, units of cyclohexene and derivatives thereof are especially preferred.

It is more preferred that the cyclic conjugated diene monomer unit be a monomer unit represented by the following formula (3):

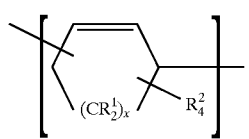

(3)

wherein each $R^1$, $R^2$ and x is as defined for formula (2).

It is most preferred that the cyclic conjugated diene monomer unit be a monomer unit represented by the following formula (5):

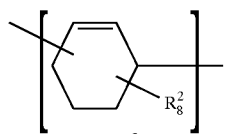

(5)

wherein each $R^2$ is as defined for formula (2).

In the polymer (α) to be used in the resin composition of the present invention, there is no particular limitation with respect to the total of the content (a) of the cyclic olefin monomer unit and the content (b) of the cyclic conjugated diene monomer unit, and the total content (a+b) may vary, depending on the intended use of the resin composition, as long as a and b satisfy the relationship: $0<a+b\leq100$. However, the total content (a+b) is generally within the range of from 0.001 to 100 wt %, preferably from 0.01 to 100 wt %, more preferably from 0.1 to 100 wt %.

Further, for obtaining a resin composition of the present invention which can be used in a field where the resin composition is required to have high thermal and mechanical properties, it is recommended that the content (a) of the cyclic olefin monomer unit in the polymer (α) be within the range of from 1 to 100 wt %, more preferably from 2 to 100 wt %, most preferably from 5 to 100 wt %, based on the total weight of the monomer units A to F of the polymer (α).

There is no particular limitation with respect to a method for producing the polymer (αa) to be used in the present invention, as long as the polymer (α) contains a cyclic olefin monomer unit and/or a cyclic conjugated diene monomer unit, and has a number average molecular weight falling within the range specified in the present invention.

Further, in the present invention, there is no particular limitation with respect to a method for forming a molecular chain of the polymer (α) containing a cyclic olefin monomer unit.

Examples of such methods include a method which comprises polymerizing a cyclic conjugated diene monomer to thereby obtain a cyclic conjugated diene homopolymer, and subjecting the obtained cyclic conjugated diene homopolymer to an addition reaction, wherein the addition reaction, such as a hydrogenation, is performed at a carbon-to-carbon double bond or bonds in a part or all of the cyclic conjugated diene monomer units contained in the cyclic conjugated diene homopolymer, to thereby convert the cyclic conjugated diene monomer unit to the cyclic olefin monomer unit; a method which comprises polymerizing a cyclic conjugated diene monomer with a comonomer copolymerizable therewith to thereby obtain a cyclic conjugated diene copolymer, and subjecting the obtained cyclic conjugated diene copolymer to an addition reaction, wherein the addition reaction is performed at a carbon-to-carbon double bond or bonds in a part or all of the cyclic conjugated diene monomer units contained in the cyclic conjugated diene copolymer, to thereby convert the cyclic conjugated diene monomer unit to the cyclic olefin monomer unit; a method which comprises polymerizing a cyclic olefin monomer with a comonomer, to thereby obtain a copolymer containing a cyclic olefin monomer unit; a method which comprises polymerizing a cyclic olefin monomer to thereby obtain a homopolymer containing a cyclic olefin monomer unit; and a method which comprises polymerizing a cyclic conjugated diene monomer with a cyclic olefin monomer, to thereby obtain a copolymer containing a cyclic olefin monomer unit. From these methods, a preferable method can be appropriately selected depending on the situation involved.

When the polymer (α) to be used in the present invention is obtained by a method involving homopolymerizing or copolymerizing a cyclic conjugated diene monomer to obtain a cyclic conjugated diene polymer, followed by hydrogenation, the degree of hydrogenation, which is defined as the ratio (mole %) of hydrogenation of the carbon-to-carbon double bonds contained in the cyclic conjugated diene monomer units in the cyclic conjugated diene polymer, is not particularly limited and may vary depending on the amount of cyclic olefin monomer unit required for the polymer in accordance with the intended use thereof. However, the degree of hydrogenation is generally within the range of from 1 to 100 mole %, preferably from 5 to 100 mole %, more preferably from 10 to 100 mole %, especially preferably from 20 to 100 mole %.

Further, especially when the resin composition of the present invention is for use in fields where the resin composition is required to have high thermal and mechanical properties, it is recommended that the degree of hydrogenation of the polymer (α) be within the range of from 50 to 100 mole %, more preferably from 70 to 100 mole %, most preferably not less than 90 mole %.

When the resin composition of the present invention is used as an industrial material, such as a structural material, the polymer (α) of the resin composition generally has a number average molecular weight within the range of from 10,000 to 5,000,000. From the viewpoint of productivity in the commercial scale production of such a polymer, it is recommended that the number average molecular weight of the polymer (α) be within the range of from 15,000 to 5,000,000, preferably within the range of from 20,000 to 3,000,000, more preferably from 25,000 to 2,000,000, still more preferably from 30,000 to 1,000,000. The most preferred range is from 40,000 to 500,000.

When the number average molecular weight of such a polymer is less than 10,000, the polymer is likely to be a markedly brittle solid substance or a viscous liquid, so that the commercial value of the polymer as an industrial material becomes extremely low.

On the other hand, when the number average molecular weight of such a polymer is more than 5,000,000, the polymer is disadvantageous in various aspects from a commercial viewpoint. For example, a polymer having such a high molecular weight has disadvantages in that a prolonged period of time is needed for the polymerization reaction, and the melt viscosity of the polymer obtained becomes high.

When the main chain of the polymer (α) to be used in the present invention is a cyclic conjugated diene homopolymer, it is preferred that the number average molecular weight of the polymer be within the range of from 40,000 to 5,000,000. When the number average molecular weight of such a polymer is less than 40,000, the polymer is likely to become markedly brittle, so that the commercial value of the polymer as a structural material becomes extremely low.

From the viewpoint of productivity in the commercial scale production of such a polymer, the number average molecular weight of the polymer is preferably within the range of from 40,000 to 3,000,000, more preferably from 40,000 to 2,000,000, still more preferably from 40,000 to 1,000,000. The most preferred range for use as a component for a resin composition is from 40,000 to 500,000.

When the main chain of the polymer (α) to be used in the present invention is a polymer comprised only of cyclic olefin monomer units or a copolymer comprised of only at least one cyclic olefin monomer unit and at least one cyclic conjugated diene monomer unit, the number average molecular weight of the polymer is from 10,000 to 5,000,000.

From the viewpoint of productivity in the commercial scale production of such a polymer, the number average molecular weight of the polymer is preferably within the range of from 15,000 to 5,000,000, more preferably from 20,000 to 3,000,000, still more preferably from 25,000 to 2,000,000, further more preferably from 30,000 to 1,000,000. The most preferred range for the polymer for use as a component for a resin composition is from 40,000 to 500,000.

When the number average molecular weight of such a polymer is less than 10,000, the polymer is likely to become a markedly brittle solid substance or a viscous liquid, so that the commercial value of the polymer as a structural material becomes extremely low.

On the other hand, when the number average molecular weight of such a polymer is more than 5,000,000, the polymer is disadvantageous in various aspects from the commercial viewpoint. For example, the polymer having such a high molecular weight has disadvantages in that a prolonged period of time is needed for the polymerization reaction, and that the melt viscosity of the polymer obtained becomes high.

When the main chain of the polymer (α) to be used in the present invention is a copolymer comprising at least one cyclic conjugated diene monomer unit and at least one monomer unit derived from a monomer copolymerizable with the cyclic conjugated diene monomer, the number average molecular weight of such a polymer is preferably within the range of from 25,000 to 5,000,000, more preferably 25,000 to 3,000,000, still more preferably from 25,000 to 2,000,000, further more preferably from 30,000 to 1,000,000. The most preferred range for the copolymer for use as a component for a resin composition is from 40,000 to 500,000.

When the main chain of the polymer (α) to be used in the present invention is a copolymer comprising at least one cyclic olefin monomer unit and at least one monomer unit derived from a monomer copolymerizable with the cyclic olefin monomer, the number average molecular weight is within the range of 10,000 to 5,000,000. From the viewpoint of productivity in the commercial scale production of such a copolymer, the number average molecular weight of the copolymer is preferably within the range of from 15,000 to 5,000,000, more preferably from 20,000 to 3,000,000, still more preferably from 25,000 to 2,000,000, further more preferably from 30,000 to 1,000,000. The most preferred range for the copolymer for use as a component for a resin composition is from 40,000 to 500,000.

When the number average molecular weight of such a copolymer is less than 10,000, the copolymer is likely to be a markedly brittle solid substance or a viscous liquid, so that the commercial value of the copolymer as an industrial material becomes low.

On the other hand, when the number average molecular weight of such a copolymer is more than 5,000,000, the copolymer is disadvantageous in various aspects from a commercial viewpoint. For example, a copolymer having such a high molecular weight has disadvantages in that a prolonged period of time is needed for the polymerization reaction, and the melt viscosity of the copolymer obtained becomes high.

When the main chain of the polymer (α) to be used in the present invention is a copolymer comprised of at least one cyclic olefin monomer unit, at least one cyclic conjugated diene monomer unit, and at least one monomer unit derived from a monomer copolymerizable with the cyclic olefin monomer and/or the cyclic conjugated diene monomer, the number average molecular weight is within the range of from 10,000 to 5,000,000.

From the viewpoint of productivity in the commercial scale production of such a copolymer, the number average molecular weight of the copolymer is preferably within the range of from 15,000 to 5,000,000, more preferably from 20,000 to 3,000,000, still more preferably from 25,000 to 2,000,000, further more preferably from 30,000 to 1,000,000. The most preferred range for the copolymer for use as a component for a resin composition is from 40,000 to 500,000.

When the number average molecular weight of such a copolymer is less than 10,000, the copolymer is likely to be a markedly brittle solid substance or a viscous liquid, so that the commercial value of the copolymer as an industrial material becomes extremely low.

On the other hand, when the number average molecular weight of such a copolymer is more than 5,000,000, the copolymer is disadvantageous in various aspects from a commercial viewpoint. For example, a copolymer having such a high molecular weight has disadvantages in that a prolonged period of time is needed for the polymerization reaction, and the melt viscosity of the copolymer obtained becomes high.

When the main chain of the polymer (α) to be used in the present invention is a block copolymer having at least one polymer block containing at least one monomer unit selected from the group consisting of a cyclic olefin monomer unit and a cyclic conjugated diene monomer unit, and optionally at least one monomer unit derived from a monomer copolymerizable with the cyclic olefin monomer and/or the cyclic conjugated diene monomer, it is preferred that the block copolymer be an at least-tri-block copolymer. The number average molecular weight of such a block copolymer is within the range of from 10,000 to 5,000,000. From the viewpoint of productivity in the commercial scale production of such a block copolymer, the number average molecular weight of the block copolymer is preferably within the range of from 15,000 to 5,000,000, more preferably from 20,000 to 3,000,000, still more preferably from 25,000 to 2,000,000, further more preferably from 30,000 to 1,000,000. The most preferred range for the block copolymer for use as a component for a resin composition is from 40,000 to 500,000.

When the number average molecular weight of such a block copolymer is less than 10,000, the block copolymer is likely to be a markedly brittle solid substance or a viscous liquid, so that the commercial value of the block copolymer as an industrial material becomes low.

On the other hand, when the number average molecular weight of such a block copolymer is more than 5,000,000, the block copolymer is disadvantageous in various aspects from a commercial viewpoint. For example, a block copolymer having such a high molecular weight has disadvantages in that a prolonged period of time is needed for the polymerization reaction, and the melt viscosity of the block polymer obtained becomes high.

In the present invention, the number average molecular weight ($\overline{Mn}$) and the weight average molecular weight ($\overline{Mw}$) are measured by gel permeation chromatography, using a calibration curve obtained with respect to standard polystyrene samples.

The $\overline{Mw}/\overline{Mn}$ value (a criterion for the molecular weight distribution) of a polymer is preferably within the range of from 1.01 to 10, more preferably from 1.03 to 7.0, still more preferably from 1.05 to 5.0.

Preferred examples of non-modified cyclic monomer unit-containing polymers to be used in the present invention include those which are obtained by individually hydrogenating polymers, such as a homopolymer of a cyclic conjugated diene monomer, a copolymer of at least two different types of cyclic conjugated diene monomers, and a copolymer of a cyclic conjugated diene monomer and a monomer copolymerizable with the cyclic conjugated diene monomer, wherein the hydrogenation is performed at a carbon-to-carbon double bond or bonds of a part or all of the cyclic conjugated diene monomer units to convert a part or all of the cyclic conjugated diene monomer units into cyclic olefin monomer units.

On the other hand, preferred examples of modified cyclic monomer unit-containing polymers to be used in the present invention include those which are obtained by individually modifying the above-mentioned preferred non-modified cyclic monomer unit-containing polymers with a reactive reagent, so that a functional group or a functional group-containing organic compound residue is bonded to such non-modified polymers.

The non-modified cyclic monomer unit-containing polymer to be used in the present invention will be explained hereinbelow in more detail.

The non-modified cyclic monomer unit-containing polymer to be used in the present invention comprises a polymer having a main chain which is comprised partly or entirely of at least one type of monomer unit selected from the group consisting of cyclic olefin monomer units and cyclic conjugated diene monomer units.

Illustratively stated, preferred examples of nonmodified cyclic monomer unit-containing polymers to be used in the present invention include homopolymers produced by polymerizing a single type of cyclic conjugated diene monomer, copolymers produced by copolymerizing a cyclic conjugated diene monomer and a monomer copolymerizable with the cyclic conjugated diene monomer, and hydrogenation products of the homopolymers and copolymers.

Representative examples of non-modified cyclic monomer unit-containing polymers to be used in the present invention include polymers having monomer units derived solely from a cyclic conjugated diene monomer, and polymers having monomer units derived from a cyclic conjugated diene monomer and from a monomer copolymerizable with the cyclic conjugated diene monomer, and hydrogenation products of these polymers.

More specific examples of non-modified cyclic monomer unit-containing polymers to be used in the present invention include a homopolymer of a single type of cyclic conjugated diene monomer, a copolymer of at least two different types of cyclic conjugated diene monomers, a copolymer of a cyclic conjugated diene monomer and a comonomer copolymerizable with the cyclic conjugated diene monomer, and hydrogenation products of the homopolymers and copolymers.

The cyclic conjugated diene monomer in the present invention preferably has an at-least-5-membered carbocyclic ring structure.

It is more preferred that the cyclic conjugated diene monomer in the present invention have a 5 to 8-membered carbocyclic ring structure, preferably a 6-membered carbocyclic ring structure.

That is, preferred examples of non-modified cyclic monomer unit-containing polymers to be used in the present invention include those which have a main chain comprised partly or entirely of at least one type of monomer unit selected from the group consisting of cyclic olefin monomer units and cyclic conjugated diene monomer units, wherein the cyclic olefin monomer unit has a cyclohexane ring and the cyclic conjugated diene monomer unit has a cyclohexene ring.

Specific examples of cyclic conjugated diene monomers include 1,3-cyclopentadiene, 1,3-cyclohexadiene, 1,3-cyclooctadiene, and derivatives thereof. Preferred examples of cyclic conjugated diene monomers include 1,3-cyclohexadiene and 1,3-cyclohexadiene derivatives. Of these, 1,3-cyclohexadiene is most preferred.

In the present invention, examples of monomers copolymerizable with a cyclic conjugated diene monomer include known polymerizable monomers.

Examples of such copolymerizable monomers include chain conjugated diene monomers, such as 1,3-butadiene, isoprene, 2,3-dimethyl-1,3-butadiene, 1,3-pentadiene and 1,3-hexadiene; vinyl aromatic monomers, such as styrene, α-methylstyrene, o-methylstyrene, p-methylstyrene, p-tert-butylstyrene, 1,3-dimethylstyrene, divinylbenzene, vinylnaphthalene, diphenylethylene and vinylpyridine; polar vinyl monomers, such as methyl methacrylate, methyl acrylate, acrylonitrile, methyl vinyl ketone and methyl α-cyanoacrylate; polar monomers, such as ethylene oxide, propylene oxide, lactone, lactam and cyclosiloxane; ethylene; and α-olefins. These monomers can be used individually or in combination.

When the non-modified cyclic monomer unit-containing polymer to be used in the present invention is a copolymer, the copolymer may possess any configuration depending on the intended use of the resin composition of the present invention.

For example, the copolymer may be a block copolymer, such as a diblock copolymer, a triblock copolymer, a tetrablock copolymer, a multiblock copolymer which is an at-least-penta block copolymer, and a radial block copolymer, a graft copolymer, a taper copolymer, a random copolymer or an alternating copolymer.

In the non-modified cyclic monomer unit-containing polymer to be used in the present invention, the monomer unit derived from a comonomer copolymerizable with the cyclic olefin monomer or cyclic conjugated diene monomer may be a monomer unit which is formed by a post-polymerization treatment, such as hydrogenation.

According to the most preferred mode of the method for producing the cyclic conjugated diene polymer to be used in the present invention, the polymer can be produced by living anionic polymerization, so that not only the molecular weight of the polymer but also the copolymer configuration can be freely designed.

With respect to the non-modified cyclic monomer unit-containing polymer to be used in the present invention, for controlling the molecular weight of the polymer or for obtaining the polymer in the form of a star shaped polymer, a configuration can be assumed such that the terminals of a plurality of polymer chains are bonded together using a conventional at least-bi-functional coupling agent, such as dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester.

When the non-modified cyclic monomer unit-containing polymer to be used in the present invention is a block copolymer, the block copolymer may contain various polymer blocks. Examples of polymer blocks contained in the block copolymer include a polymer block comprised of monomer units derived solely from at least one type of cyclic olefin monomer, a polymer block comprised of monomer units derived solely from at least one type of cyclic conjugated diene monomer, a polymer block comprised of monomer units derived from at least one type of cyclic olefin monomer and at least one type of conjugated diene monomer, a polymer block comprised of monomer units derived from at least one type of cyclic olefin monomer and at least one comonomer copolymerizable with the cyclic olefin monomer, a polymer block comprised of monomer units derived from at least one type of cyclic conjugated diene monomer and at least one comonomer copolymerizable with the cyclic conjugated diene monomer, a polymer block comprised of monomer units derived from at least one type of cyclic olefin monomer, at least one type of cyclic conjugate diene monomer and at least one comonomer copolymerizable with these monomers, and a polymer block comprised of monomer units derived solely from at least one comonomer copolymerizable with a cyclic conjugated diene monomer. For attaining various purposes, various types of polymer blocks can be designed and produced by polymerization. By appropriately choosing and bonding such polymer blocks, a non-modified cyclic monomer unit-containing block copolymer having suitable properties for the intended use can be obtained.

When a part or all of a polymer block in the non-modified cyclic monomer unit-containing polymer to be used in the present invention is comprised of cyclic olefin monomer units, cyclic conjugated diene monomer units or both of these monomer units, it is recommended that the polymer block contain a contiguous arrangement of at least 10 such monomer units, preferably 20 or more such monomer units, more preferably 30 or more such monomer units, from the viewpoint of obtaining a block copolymer having excellent thermal and mechanical properties.

As the method of producing the non-modified cyclic monomer unit-containing block copolymer to be used in the present invention, there can be mentioned, for example, a method which comprises: preparing various types of block unit polymers, namely, a block unit polymer comprised of monomer units derived solely from at least one type of cyclic conjugated diene monomer, a block unit polymer comprised of monomer units derived from at least one cyclic conjugated diene monomer and at least one comonomer copolymerizable with the cyclic conjugated diene monomer, and a block unit polymer comprised of monomer units derived solely from at least one comonomer copolymerizable with a cyclic conjugated diene monomer; choosing an appropriate combination of these block unit polymers; polymerization-bonding the combination of block unit polymers together; and, if desired, subjecting the resultant cyclic monomer unit-containing block copolymer to hydrogenation.

Specific examples of preferred modes of the method for producing the block copolymer include the following modes.

One mode of the method comprises the steps of forming by polymerization a block unit polymer containing a monomer unit derived from at least one type of cyclic conjugated diene monomer, or a block unit polymer derived solely from the cyclic conjugated diene monomer; polymerizing the block unit polymer with at least one type of comonomer copolymerizable with the cyclic conjugated diene monomer, wherein the comonomer is successively bonded to one or both terminals of the block unit polymer by polymerization; and, if desired, subjecting the block copolymer to hydrogenation.

Another mode of the method comprises the steps of polymerizing at least one type of comonomer copolymerizable with a cyclic conjugated diene monomer to obtain a block unit polymer; polymerizing the block unit polymer with at least one type of cyclic conjugated diene monomer, and optionally with at least one type of comonomer copolymerizable with the cyclic conjugated diene monomer, wherein the cyclic conjugated diene monomer and the optional comonomer are successively bonded to one or both terminals of the block unit polymer by polymerization; and, if desired, subjecting the block copolymer to hydrogenation.

A further mode of the method comprises the steps of forming by polymerization a block unit polymer containing a monomer unit derived from at least one type of cyclic conjugated diene monomer, or a block unit polymer comprised of monomer units derived solely from the cyclic conjugated diene monomer; polymerizing the block unit polymer with at least one type of comonomer copolymerizable with the cyclic conjugated diene monomer to obtain a polymer; successively bonding to the polymer by polymerization a block unit polymer containing a monomer unit derived from at least one cyclic conjugated diene monomer or a block unit polymer comprised of monomer units derived solely from the cyclic conjugated diene monomer; and, if desired, subjecting the block copolymer to hydrogenation.

Still a further mode of the method comprises the steps of polymerizing at least one type of comonomer copolymerizable with the cyclic conjugated diene monomer to obtain a block unit polymer; polymerizing the block unit polymer with a block unit polymer containing a monomer unit derived from at least one cyclic conjugated diene monomer or a block unit polymer comprised of monomer units derived solely from the cyclic conjugated diene polymer; successively bonding to the resultant polymer by polymerization at least one type of comonomer copolymerizable with the cyclic conjugated diene monomer; and, if desired, subjecting the block copolymer to hydrogenation.

Still a further mode of the method comprises the steps of forming by polymerization a block unit polymer containing a monomer unit derived from at least one cyclic conjugated diene monomer or a block unit polymer comprised of monomer units derived solely from the cyclic conjugated diene monomer; polymerizing the block unit polymer with at least one type of comonomer copolymerizable with the cyclic conjugated diene monomer to obtain a polymer; bonding the terminals of the molecular chain of the polymer together using a conventional at least-bi-functional coupling agent (such as dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester); and, if desired, subjecting the resultant block copolymer to hydrogenation.

Still a further mode of the method comprises the steps of forming by polymerization a block unit polymer containing a monomer unit derived from at least one cyclic conjugated diene monomer or a block unit polymer comprised of monomer units derived solely from the cyclic conjugated diene monomer; introducing a functional group to one or both terminals of the block unit polymer using a terminal modifier (ethylene oxide, propylene oxide, cyclohexene oxide, $CO_2$, acid chloride or the like), to obtain a functional block unit plymer; if desired, subjecting the obtained functional block unit polymer to hydrogenation; and bonding the non-hydrogenated or hydrogenated functional block unit polymer to other functional polymers which have functional groups capable of being bonded to the functional group of the functional block unit polymer.

Still a further mode of the method comprises steps of forming by polymerization a block unit polymer containing a monomer unit derived from at least one cyclic conjugated diene monomer or a block unit polymer comprised of monomer units derived solely from the cyclic conjugated diene monomer; polymerizing the block unit polymer with at least one type of comonomer copolymerizable with the cyclic conjugated diene monomer to obtain a polymer; introducing a functional group to one or both terminals of the thus obtained polymer using a terminal modifier (ethylene oxide, propylene oxide, cyclohexene oxide, $CO_2$, acid chloride or the like) to obtain a functional polymer; if desired, subjecting the functional polymer to hydrogenation; and bonding the non-hydrogenated or hydrogenated functional block unit polymer to other functional polymers which have functional groups capable of being bonded to the functional group of the functional block unit polymer.

Still a further mode of the method comprises polymerizing at least one type of cyclic conjugated diene monomer with at least one type of comonomer copolymerizable with the cyclic conjugated diene monomer, wherein the at least one comonomer has a different polymerization rate from that of the cyclic conjugated diene monomer, to thereby obtain a taper block copolymer; and, if desired, subjecting the obtained taper block copolymer to hydrogenation.

Still a further mode of the method comprises polymerizing a cyclic conjugated diene monomer and at least one type of comonomer copolymerizable with the cyclic conjugated diene monomer, wherein the ratio of the cyclic conjugated diene monomer to the at least one comonomer is not unity; and, if desired, subjecting block copolymer to hydrogenation.

Still a further mode of the method comprises the steps of forming by polymerization a block unit polymer comprised of monomer units derived from the cyclic conjugated diene monomer, wherein the polymerization is conducted until a desired certain conversion is achieved; polymerizing the block unit polymer with at least one type of comonomer, which is copolymerizable with and different in polymerization rate from the cyclic conjugated diene monomer, to thereby obtain a block copolymer; and, if desired, subjecting the resultant block copolymer to hydrogenation.

In the present invention, the block unit polymer comprised of at least one type of cyclic olefin monomer unit, at least one type of cyclic conjugated diene monomer unit, or both of such monomer units may further comprise a monomer unit derived from at least one comonomer copolymerizable with the cyclic conjugated diene monomer or the cyclic olefin monomer.

Further, in the present invention, the block unit polymer comprised of a monomer unit derived from at least one comonomer copolymerizable with the cyclic conjugated diene monomer may further comprise at least one type of monomer unit selected from the group consisting of cyclic olefin monomer units and cyclic conjugated diene monomer units.

In the present invention, with respect to polymer blocks comprising at least one type of a cyclic olefin monomer unit, it is most preferred to use a polymer block comprising or consisting of monomer units comprising a cyclohexane ring.

With respect to polymer blocks comprising a cyclic conjugated diene monomer unit, it is most preferred to use a polymer block comprising or consisting of monomer units comprising a cyclohexene ring.

In the present invention, for obtaining a non-modified cyclic conjugated diene block copolymer or a modified cyclic conjugated diene block copolymer to be used as a thermoplastic elastomer or a special transparent resin having impact resistance, it is necessary that the block copolymer be comprised of at least two agglomeration phases (block units) and at least one elastomer phase (block unit), and that these two types of phases form a microdomain structure.

In the polymeric molecular chain of such a block copolymer, the agglomeration phase functions as a physical crosslinking site at a temperature lower than Tg, so that the block copolymer has elastomeric properties (rubber elasticity). On the other hand, at Tg or a temperature higher than Tg, the agglomeration phase becomes fluid, so that the block copolymer is imparted with fluidity. Therefore, in this case, it becomes possible to perform an injection molding. Further, the block copolymer can be used as a recyclable material.

In the present invention, when employing the most preferred polymerization method, i.e., living anionic polymerization, it is possible to obtain a cyclic conjugated diene block copolymer comprising at least two block units (hereinafter frequently referred to as "X blocks") each comprised mainly of a cyclic conjugated diene monomer or a derivative thereof, or comprised of a cyclic conjugated diene monomer and a vinyl aromatic monomer, and at least one block unit (hereinafter frequently referred to as "Y block") comprised mainly of a chain conjugated diene monomer or a derivative thereof. Then, by subjecting the obtained block copolymer to a hydrogenation reaction, a block copolymer having a cyclic olefin monomer unit can be obtained.

For example, as the block copolymer having elastomeric properties (rubber elasticity), such as a thermoplastic elastomer or a special transparent resin having impact resistance, linear block copolymers respectively represented by the formulae (6) and radial block copolymers respectively represented by the formulae (7) can be produced:

$$(X-Y)_l, X-(Y-X)_m, Y-(X-Y)_n \tag{6}$$

wherein each of l and n is independently an integer of 2 or more, and m is an integer of 1 or more; and

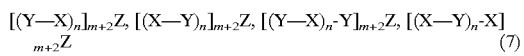

$$[(Y-X)_n]_{m+2}Z, [(X-Y)_n]_{m+2}Z, [(Y-X)_n-Y]_{m+2}Z, [(X-Y)_n-X]_{m+2}Z \tag{7}$$

wherein m is an integer of 0 or more, and n is an integer of 1 or more; and each Z independently represents a residue of a multifunctional coupling agent, such as dimethyldichlorosilane, methylene chloride, silicon tetrachloride, tin tetrachloride or an epoxidized soybean oil, or a residue of a polymerization initiator, such as a multifunctional organometallic compound containing a metal belonging to Group IA of the Periodic Table.

There is no particular limitation with respect to the polymerization method for producing the non-modified cyclic monomer unit-containing polymer to be used in the present invention, and any conventional polymerization method (such as radical, anionic, cationic, ring-opening, condensation, addition or coordination polymerization) can be used as long as a non-modified polymer satisfying the requirements of the present invention can be obtained. However, the most preferable polymerization method for obtaining a non-modified cyclic monomer unit-containing polymer is a living anionic polymerization using, as a polymerization catalyst, a complex of at least one organometallic compound containing a metal belonging to Group IA (Group IA metal) with at least one complexing agent (most preferably an amine) to obtain a non-modified cyclic monomer unit-containing polymer. If desired, the obtained polymer is hydrogenated. In this way, a non-modified cyclic monomer unit-containing polymer which has a desired molecular weight and a desired polymer structure can be obtained.

Examples of metals belonging to Group IA which can be used in the most preferred polymerization method to be employed in the present invention include lithium, sodium, potassium, rubidium, cesium and francium. Among these, lithium, sodium and potassium are preferred. Of these, lithium is especially preferred.

In the present invention, as mentioned above, the complex as a polymerization catalyst to be used in the polymerization is a complex of at least one organometallic compound containing a Group IA metal with at least one complexing agent.

Preferable examples of complexes include complexes of an organolithium compound, an organosodium compound, or an organopotassium compound.

The most preferable complex is a complex of an organolithium compound.

The organolithium compound, which can be preferably used in the polymerization catalyst to be used in the above-mentioned polymerization method, is a compound containing at least one lithium atom bonded to an organic molecule containing at least one carbon atom or to an organic polymer.

Examples of such an organic molecule include a $C_{1-C20}$ alkyl group, a $C_2$–$C_{20}$ unsaturated aliphatic hydrocarbon group, a $C_5$–$C_{20}$ aryl group, a $C_3$–$C_{20}$ cycloalkyl group, and a $C_4$–$C_{20}$ cyclodienyl group.

Examples of organolithium compounds usable in the polymerization method to be used in the present invention include methyllithium, ethyllithium, n-pro-pyllithium, isopropyllithium, n-butyllithium, sec-butyllithium, tert-butyllithium, pentyllithium, hexyllithium, aryllithium, cyclohexyllithium, phenyllithium, hexamethylenedilithium, cyclopentadienyllithium, indenyllithium, butadienyldilithium, and isoprenyldilithium. Further, known oligomeric or polymeric organolithium compounds, each containing a lithium atom in a polymeric molecular chain thereof, such as polybutadienyllithium, polyisoprenyllithium and polystyryllithium, can also be used.

As a preferred organolithium compound, there is no particular limitation with respect to the type thereof as long as it forms a stable complex (compound). However, representative examples of such organolithium compounds include methyllithium, ethyllithium, n-pro-pyllithium, isopropyllithium, n-butyllithium, sec-butyllithium, tert-butyllithium, and cyclohexyllithium.

Of these, n-butyllithium (n-BuLi) is most preferred from a commercial point of view.

The organometallic compounds containing a Group IA metal usable in the above-mentioned polymerization method can be used individually or, if desired, in combination.

As regards the catalyst to be used in the above-mentioned polymerization method, the most preferred complexing agent for forming a complex of an organometallic compound containing a Group IA metal is one or more types of amine.

Examples of amines as complexing agents include an organic amine or an organic polymeric amine, which contains at least one $R^1R^2N$— group (wherein each of $R^1$ and $R^2$ independently represents an alkyl group, an aryl group, or a hydrogen atom) which is a polar group having a non-covalent electron pair capable of coordinating with the organometallic compound containing a Group IA metal to thereby form a complex.

Among these amines, a tert-amine is most preferred.

Preferred examples of tert-amines usable in the present invention include trimethylamine, triethylamine, dimethylaniline, diethylaniline, tetramethyldiaminomethane, tetramethylethylenediamine, tetramethyl-1,3-propanediamine, tetramethyl-1,3-butanediamine, tetramethyl-1,4-butanediamine, tetramethyl-1,6-hexanediamine, tetramethyl-1,4-phenylenediamine, tetramethyl-1,8-naphthalenediamine, tetramethylbenzidine, tetraethylethylenediamine, tetraethyl-1,3-propanediamine, tetramethyldiethylenetriamine, tetraethyldiethylenetriamine, pentamethyldiethylenetriamine, pentaethyldiethylenetriamine, diazabicyclo[2.2.2]octane, 1,5-diazabicyclo[4.3.0]-5-nonene, 1,8-diazabicyclo[5.4.0]-7-undecene, 1,4,8,11-tetramethyl-1,4,8,11-tetraazacyclotetradecane, tetrakis(dimethylamino)ethylene, tetraethyl-2-butene-1,4-diamine, and hexamethylphosphoric triamide (HMPT).

Most preferred examples of amines include tetramethylmethylenediamine (TMMDA), tetraethylmethylenediamine (TEMDA), tetramethylethylenediamine (TMEDA), tetraethylethylenediamine (TEEDA), tetramethylpropylenediamine (TMPDA), tetraethylpropylenediamine (TEPDA), tetramethylbutylenediamine (TMBDA), tetraethylbutylenediamine (TEBDA), tetramethylpentanediamine, tetraethylpentanediamine, tetramethylhexanediamine (TMHDA), tetraethylhexanediamine (TEHDA), and diazabicyclo[2.2.2]octane (DABCO).

From the commercial point of view, tetramethylethylenediamine (TMEDA) is an especially preferred example of a complexing agent usable in the present invention.

The above-mentioned amines as complexing agents may be used individually or in combination.

With respect to the polymerization catalyst (which is prepared from an organometallic compound containing at least one metal of Group IA (Group IA metal) and at least one complexing agent) to be used for producing a cyclic conjugated diene polymer by the above-mentioned most preferred polymerization method (i.e., living anionic polymerization), it is desired that the catalyst be one which is prepared from n-butyllithium (n-BuLi) and at least one amine selected from the group consisting of tetramethylmethylenediamine (TMMDA), tetramethylethylenediamine (TMEDA), tetramethylpropylenediamine (TMPDA), and diazabicyclo[2.2.2]octane (DABCO).

From the commercial point of view, it is most preferred that the catalyst be one which is prepared from n-butyllithium (n-BuLi), and tetramethylethylenediamine (TMEDA).

In the above-mentioned most preferred polymerization method, it is preferred that, prior to the polymerization reaction, a complex be prepared by reacting an organometallic compound containing a Group IA metal with at least one amine (as a complexing agent), and the prepared complex be used as a polymerization catalyst.

In the present invention, there is no particular limitation with respect to the method for preparing the complex (polymerization catalyst). If desired, the preparation can be conducted by a conventional method.

Examples of such conventional methods include a method comprising dissolving the organometallic compound containing a Group IA metal in an organic solvent in an atmosphere of a dried inert gas, and adding thereto a solution of the complexing agent (amine); and a method comprising dissolving the complexing agent (amine) in an organic solvent in an atmosphere of a dried inert gas, and adding thereto a solution of the organometallic compound containing a Group IA metal. From these methods, a preferred method can be appropriately selected.

It is preferred that the above-mentioned organic solvent be appropriately selected depending on the type and amount of the organometallic compound and the type and amount of the complexing agent (amine), and be well deaerated and dried prior to use.

The reaction for obtaining the complex of at least one organometallic compound with at least one complexing agent (amine) is generally conducted at $-100°$ C. to $100°$ C.

Examples of inert gases to be used in the preparation of a complex include helium, nitrogen and argon. Of these, nitrogen and argon are preferred from the commercial point of view.

In the preparation of a complex from a Group IA metal-containing organometallic compound and an amine as a complexing agent, which complex is to be used in the above-mentioned most preferred polymerization method for producing a cyclic conjugated diene polymer, it is preferred to employ the following molar ratio with respect to the amine and the Group IA metal contained in the organometallic compound. The molar ratio is:

generally:
  A/B=1,000/1 to 1/1,000,
preferably:
  A/B=500/1 to 1/500,
more preferably:
  A/B=100/1 to 1/100,
still more preferably:
  A/B=50/1 to 1/50,
most preferably:
  A/B=20/1 to 1/20,
wherein A is the molar amount of the amine (amine compound molecule), and B is the molar amount of the Group IA metal contained in the organometallic compound.

When the above-mentioned molar ratio A/B is within the range as defined above, a stable complex can be obtained in high yield, which can be advantageously used for producing a cyclic conjugated diene polymer having a narrow molecular weight distribution.

When the molar ratio A/B is outside the range as defined above, various disadvantages are likely to be caused such that the production process for the complex becomes costly, and that the complex becomes unstable, so that concurrently with the polymerization reaction, undesirable side reactions, such as a transfer reaction and a Group IA metal hydride elimination reaction, are likely to occur.

As mentioned above, the most preferred method for producing a cyclic conjugated diene polymer is living anionic polymerization using the complex as a polymerization catalyst.

The polymerization method to be employed in the present invention is not specifically limited, and can be conducted by vapor phase polymerization, bulk polymerization or solution polymerization.

The polymerization reaction can be conducted in a batchwise, semibatchwise or continuous manner.

Examples of polymerization solvents to be used in the solution polymerization reaction include aliphatic hydrocarbons, such as butane, n-pentane, n-hexane, n-heptane, n-octane, iso-octane, n-nonane and n-decane; alicyclic hydrocarbons, such as cyclopentane, methylcyclopentane, cyclohexane, methylcyclohexane, ethylcyclohexane, cycloheptane, cyclooctane, decalin and norbornane; aromatic hydrocarbons, such as benzene, toluene, xylene, ethylbenzene and cumene; and ethers, such as diethyl ether and tetrahydrofuran.

These polymerization solvents may be used individually or in combination.

Preferred polymerization solvents are aliphatic hydrocarbons, alicyclic hydrocarbons and aromatic hydrocarbons. More preferred polymerization solvents are aliphatic hydrocarbons, alicyclic hydrocarbons and mixtures thereof. Most preferred polymerization solvents are n-hexane, cyclohexane and mixtures thereof.

In the polymerization method for producing a cyclic conjugated diene polymer, the amount of the polymerization catalyst is not specifically limited, and may be varied depending on the intended use of the polymer to be used. However, the polymerization catalyst is generally used in an amount of from $1\times10^{-6}$ mol to $1\times10^{-1}$ mol, preferably from $5\times10^{-6}$ mol to $5\times10^{-2}$ mol, in terms of the molar amount of metal atom per mol of the monomer or monomers.

In the polymerization method, the polymerization reaction temperature can be appropriately selected. However, the polymerization reaction temperature is generally from $-100°$ C. to $150°$ C., preferably from $-80°$ C. to $120°$ C., more preferably from $-30°$ C. to $110°$ C., and most preferably from $0°$ C. to $100°$ C. From a commercial point of view, it is advantageous that the polymerization reaction temperature be from room temperature to $90°$ C.

In the polymerization method, the polymerization reaction time is not specifically limited, and may be varied depending on the intended use of the polymer and the other polymerization reaction conditions. However, the polymerization reaction time is generally not longer than 48 hours, preferably from 1 to 10 hours.

In the polymerization method, it is preferred that the polymerization reaction be conducted in an atmosphere of an inert gas, such as nitrogen, argon or helium. It is especially preferred that such an inert gas be used after being well dried.

With respect to the pressure in the polymerization reaction system, there is no particular limitation, and a widely varied pressure can be chosen as long as the pressure is sufficient to maintain the monomer or monomers and the solvent at a liquid state at a polymerization temperature within the above-mentioned range.

Further, care must be taken to prevent the intrusion of impurities, which deactivate a polymerization catalyst or the active terminals of the polymer being formed, such as water, oxygen and carbon dioxide, into the polymerization reaction system.

In the polymerization method, the polymerization catalysts may be used individually or in combination.

In the polymerization method, when a predetermined degree of polymerization has been reached, conventional additives may be added to the polymerization reaction system. Examples of such conventional additives include a terminal modifier, such as a halogen gas, carbon dioxide, carbon monoxide, an alkylene oxide, an alkylene sulfide, an isocyanate compound, an imino compound, an aldehyde compound, a ketone compound, a thioketone compound, an ester, a lactone, an amido group-containing compound, a urea compound or an acid anhydride; a terminal-branching agent, such as a polyepoxide, a polyisocyanate, a polyimine, a polyaldehyde, a polyanhydride, a polyester, a polyhalide or a metal halide; a coupling agent, such as dimethyldichlorosilane; methyltrichlorosilane, dimethyldibromosilane, methyltribromosilane, titanocene dichloride, zirconocene dichloride, methylene chloride, methylene bromide, chloroform, carbon tetrachloride, silicon tetrachloride, titanium tetrachloride, tin tetrachloride, an epoxidized soybean oil or an ester; a polymerization terminator; a polymerization stabilizer; and a stabilizing agent, such as a heat stabilizer, an antioxidant or an ultraviolet absorber.

In the polymerization method, conventional heat stabilizers, antioxidants and ultraviolet absorbers can be used.

For example, heat stabilizers, antioxidants and ultraviolet absorbers of phenol type, organic phosphate type, organic phosphite type, organic amine type and organic sulfur type can be used.

The amount of each of the heat stabilizer, antioxidant and ultraviolet absorber to be added is generally from 0.001 to 10 parts by weight, relative to 100 parts by weight of the cyclic conjugated diene polymer.

With respect to the polymerization terminator, any conventional polymerization terminator can be used as long as it can deactivate the polymerization activating species of the polymerization catalyst in the present invention. Preferred examples of polymerization terminators include water, a $C_1$–$C_{10}$ alcohol, a ketone, a polyhydric alcohol (such as ethylene glycol, propylene glycol, or glycerol), a phenol, a carboxylic acid, and a halogenated hydrocarbon.

The amount of polymerization terminator to be added is generally within the range of from 0.001 to 10 parts by weight, relative to 100 parts by weight of the polymer containing a cyclic monomer unit. The polymerization terminator may be added before or simultaneously with the addition of a heat stabilizer, an antioxidant and/or an ultraviolet absorber. Alternatively, the active terminals of the polymer may be deactivated by contacting the active terminals with a molecular hydrogen.

It is most preferred that the non-modified cyclic monomer unit-containing polymer in the present invention be obtained by a method which comprises polymerizing a cyclic conjugated diene monomer to thereby obtain a cyclic conjugated diene monomer unit-containing polymer and, if desired, subjecting the obtained polymer to hydrogenation to thereby hydrogenate unsaturated carbon-carbon bonds in the polymer.

One example of the most preferred method for obtaining a non-modified cyclic monomer unit-containing polymer as a hydrogenated polymer, comprises polymerizing a cyclic conjugated diene monomer to thereby obtain a polymer, subjecting the obtained polymer to hydrogenation in the presence of a hydrogenation catalyst to thereby hydrogenate a part or all of the unsaturated carbon—carbon bonds contained in the cyclic conjugated diene polymer.

In this instance, a desired hydrogenated polymer can be obtained by subjecting a cyclic conjugated diene polymer to hydrogenation after a predetermined degree of polymerization has been reached in the polymerization reaction for obtaining the cyclic conjugated diene polymer.

For performing the hydrogenation, the following methods can be mentioned:

a batchwise method which comprises stopping a polymerization reaction by deactivating a polymerization catalyst, adding a hydrogenation catalyst to the same reactor as used in the polymerization reaction, and introducing hydrogen gas into the reactor, to thereby obtain a hydrogenated polymer;

a semi-batchwise method which comprises stopping a polymerization reaction by deactivating a polymerization catalyst to thereby obtain a polymer solution, transferring the obtained polymer solution to a reactor other than that used in the polymerization reaction, adding a hydrogenation catalyst to the reactor, and introducing hydrogen gas into the reactor, to thereby obtain a hydrogenated polymer; and a continuous method which comprises continuously conducting a polymerization reaction and a hydrogenation in a tubular reactor, to thereby obtain a hydrogenated polymer.

From the above-mentioned methods, a desirable method can be appropriately selected.

As mentioned above, the hydrogenation of a cyclic conjugated diene polymer is conducted in an atmosphere of hydrogen gas in the presence of a hydrogenation catalyst.

More illustratively stated, the hydrogenation is generally conducted by a method in which a polymer solution is maintained at a predetermined temperature in an atmosphere of hydrogen gas or an inert gas, and a hydrogenation catalyst is added to the polymer solution while agitating or not agitating, followed by introduction of hydrogen gas into the reaction system until a predetermined level of pressure is reached.

The hydrogenation can be conducted in a conventional manner, namely, in a batchwise, a semi-batchwise or a continuous manner. These manners can be employed individually or in combination.

The type and amount of the hydrogenation catalyst to be used in the present invention are not particularly limited as long as the catalyst used can provide a degree of hydrogenation such that the intended amount of a saturated cyclic molecular unit is introduced. However, it is preferred that the hydrogenation catalyst used in the present invention be a homogeneous hydrogenation catalyst (organometallic compound or complex) or heterogeneous hydrogenation catalyst (solid catalyst) which contains at least one member selected from the group consisting of metals belonging to Groups IVA to VIII of the Periodic Table and rare earth metals.

It is most preferred that the hydrogenation catalyst be a homogeneous hydrogenation catalyst, i.e., an organometallic compound or complex which contains at least one member selected from the group consisting of Group IVA to VIII metals and rare earth metals.

These organometallic compounds or complexes as a hydrogenation catalyst can be supported on an inorganic compound, such as a silica or a zeolite, or an organic polymer, such as a crosslinked polystyrene.

Examples of metals contained in the hydrogenation catalyst used in the present invention include titanium, zirconium, hafnium, chromium, molybdenum, tungsten, manganese, rhenium, iron, cobalt, nickel, ruthenium, rhodium, palladium, osmium, iridium, platinum, lanthanum, cerium, praseodymium, neodymium, promethium, samarium, europium, gadolinium, terbium, dysprosium, holmium, erbium, thulium, ytterbium and lutetium. Among these, titanium, zirconium, hafnium, rhenium, cobalt, nickel, ruthenium, rhodium, palladium, cerium, neodymium, samarium, europium, gadolinium and ytterbium are preferred.

Titanium, cobalt, nickel, ruthenium, rhodium and palladium are especially preferred.

For obtaining a homogeneous hydrogenation catalyst using organometallic compounds or complexes, which contain the above-mentioned metals, it is requisite that a ligand, such as hydrogen, a halogen, a nitrogen compound or an organic compound, be coordinated with or bonded to such metals. These ligands can be used individually or in combination. When these ligands are used in combination, it is preferred that an appropriate combination of ligands be selected so that the resultant organometallic compound or complex becomes soluble in the solvent used.

Examples of ligands include hydrogen; fluorine; chlorine; bromine; nitrogen monoxide; carbon monoxide; an organic compound containing a functional group, such as a hydroxyl group, an ether group, an amino group, a thiol group, a phosphine group, a carbonyl group, an olefin group or a diene group; or a non-polar organic compound containing no functional groups.

Examples of organic ligands include aldehydes, such as salicylaldehyde, 2-hydroxy-1-naphthalaldehyde and 2-hydroxy-3-naphthalaldehyde; hydroxyphenones, such as 2'-hydroxyacetophenone, 2'-hydroxybutyrophenone and 2'-hydroxypropiophenone; diketones, such as acetylacetone, benzoylacetone, propionylacetone, isobutylacetone, valerylacetone and ethylacetylacetone; carboxylic acids, such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, Versatic acid (synthetic acid comprising a mixture of isonomers of $C_{10}$ monocarboxylic acids, sold by Shell Chemical Co.), phenylacetic acid, benzoic acid, 2-naphthoic acid, maleic acid, succinic acid, hexanethiol acid, 2,2-dimethylbutane thionic acid, decane thionic acid and thiobenzoic acid; organic phosphoric acids, such as dibutyl phosphate, dipentyl phosphate, dihexyl phosphate, diheptyl phosphate, dioctyl phosphate, bis(2-ethylhexyl)phosphate, bis(1-methylheptyl) phosphate, dilauryl phosphate, dioleyl phosphate, diphenyl phosphate, bis(p-nonylphenyl)-phosphate, bis[poly (ethylene glycol)-p-nonylphenyl]-phosphate, (butyl)(2-ethylhexyl)phosphate, (1-methylheptyl)(2-ethylhexyl) phosphate, (2-ethylhexyl)(p-nonylphenyl)phosphate, monobutyl 2-ethylhexylphosphonate, mono-2-ethylhexyl 2-ethylhexylphosphonate, mono-2-ethylhexyl phenylphosphonate, mono-p-nonylphenyl 2-ethylhexylphosphonate, mono-2-ethylhexyl phosphonate, mono-1-methylheptyl phosphonate, mono-p-nonylphenyl phosphonate, dibutylphosphinic acid, bis(2-ethylhexyl)-phosphinic acid, bis(1-methylheptyl)phosphinic acid, dilaurylphosphinic acid, dioleylphosphinic acid, diphenylphosphinic acid, bis(p-nonylphenyl)phosphinic acid, butyl(2-ethylhexyl)phosphinic acid, (2-ethylhexyl)(1-methylheptyl) phosphinic acid, (2-ethylhexyl)(p-nonylphenyl)phosphinic acid, butylphosphinic acid, 2-ethylhexylphosphinic acid, 1-methylheptylphosphinic acid, oleylphosphinic acid, laurylphosphinic acid, phenylphosphinic acid, and p-nonylphenylphosphinic acid; alcohols, phenols and thiols, such as ethyl alcohol, n-propyl alcohol, iso-propyl alcohol, tertbutyl alcohol, tert-amyl alcohol, n-hexyl alcohol, cyclohexyl alcohol, allyl alcohol, 2-butenyl alcohol, 3-hexenyl alcohol, 2,5-decadienyl alcohol, benzyl alcohol, phenol, catechol, 1-naphthol, 2-naphthol, 2,6-di-tert-butylphenol, 2,6-di-tert-butyl-4-methylphenol, 2,4,6-tri-tert-butylphenol, 4-phenylphenol, ethanethiol, 1-butanethiol, 2-pentanethiol, 2-iso-butanethiol, thiophenol, 2-naphthalenethiol, cyclohexanethiol, 3-methylcyclohexanethiol, 2-naphthalenethiol, benzene methanethiol, and 2-naphthalene methanethiol; acetylacetone, tetrahydrofuran, diethyl ether, dimethyl sulfoxide, pyridine, ethylene diamine, dimethyl formamide, triphenyl phosphine, a cyclopentadienyl group, a substituted cyclopentadienyl group, an indenyl group, a fluorenyl group, a π-allyl group, a substituted allyl group, a cyclooctadienyl group, a methyl group, an ethyl group, a butyl group, a phenyl group and a tolyl group.

These ligands can be used individually or in combination. When these ligands are used in combination, it is especially preferred that an appropriate combination of ligands be selected so that the resultant organometallic compound or complex becomes soluble in the solvent used.

Various types of hydrogenation catalysts can be used individually or, if desired, in combination.

Further, from a commercial point of view, it is most preferred that, as a hydrogenation catalyst, use be made of a combination of an organometallic compound or complex which contains at least one member selected from the group consisting of Group IVA to VIII metals and rare earth metals, and at least one organometallic compound containing a metal selected from the group consisting of Group IA to IIA metals and Group IIIB metals, such as alkyllithium, alkylmagnesium, and alkylaluminum.

Specific examples of organometallic compounds containing a metal selected from the group consisting of Group IA to IIA metals and Group IIIB metals include an alkyllithium, such as methyllithium, ethyllithium, n-propyllithium, i-propyllithium, n-butyllithium, sec-butyllithium, tert-butyllithium, pentyllithium, hexyllithium, phenyllithium, or cyclopentadienyllithium; an alkylmagnesium, such as dimethylmagnesium, diethylmagnesium or dibutylmagnesium; and an alkylaluminum, such as trimethylaluminum, triethylaluminum, triisopropylaluminum, tri-n-butylaluminum, triisobutylaluminum, trihexylaluminum, tricyclohexylaluminum, diethylaluminum hydride, diisobutylaluminum hydride, methylaluminoxane or ethylaluminoxane. These organometallic compounds can be used individually or in combination.

In the present invention, when the non-modified cyclic monomer unit-containing polymer is a hydrogenated polymer, the amount of hydrogenation catalyst to be used for a hydrogenation can be appropriately determined depending on the type (e.g., structure of the main chain and molecular weight) of the polymer to be hydrogenated, or the hydrogenation reaction conditions (e.g., solvent, temperature, concentration, and viscosity of the solution). However, the amount of the hydrogenation catalyst is generally within the range of from 0.1 to 100,000 ppm, preferably from 1 to 50,000 ppm, more preferably from 5 to 10,000 ppm, most preferably from 10 to 10,000 ppm, in terms of the concentration of metal atoms, based on the amount of the polymer to be hydrogenated.

When the amount of the hydrogenation catalyst is extremely small, a satisfactory rate of hydrogenation reaction cannot be obtained. When the amount of the hydrogenation catalyst is too large, the rate of hydrogenation reaction becomes high, but the use of too large an amount of the hydrogenation catalyst is disadvantageous from an economical point of view. In addition, when the amount of the hydrogenation catalyst is too large, the separation and recovery of the hydrogenation catalyst become difficult, leading to undesirable results, for example, adverse effects of the residual catalyst on the polymer.

In the present invention, it is preferred that a solvent to be used for the hydrogenation reaction be inert to the hydrogenation catalyst and capable of well dissolving therein the polymer to be hydrogenated and the hydrogenation catalyst.

Examples of solvents to be used in the hydrogenation include aliphatic hydrocarbons, such as n-pentane, n-hexane, n-heptane, n-octane, iso-octane, n-nonane and n-decane; alicyclic hydrocarbons, such as cyclopentane, methylcyclopentane, cyclohexane, methylcyclohexane, cycloheptane, cyclooctane, decalin, and norbornane; aromatic hydrocarbons, such as benzene, toluene, xylene, ethylbenzene and cumene; hydrocarbon halogenides, such as methylene chloride, dichloroethane, chlorobenzene, dichlorobenzene and trichlorobenzene; and ethers, such as diethyl ether, diglyme, triglyme and tetrahydrofuran. These solvents may be used individually or in combination. Suitable solvents can be appropriately selected, depending on the properties of the polymer to be hydrogenated or the hydrogenation reaction conditions.

From a commercial point of view, it is preferred to choose solvents to be used for the hydrogenation from aliphatic hydrocarbons, alicyclic hydrocarbons, and aromatic hydrocarbons. Most preferred solvents are aliphatic hydrocarbons, alicyclic hydrocarbons, and a mixture of these solvents.

In the present invention, from a commercial point of view, it is advantageous that the polymerization reaction and the hydrogenation be consecutively conducted. Therefore, it is preferred that the solvent to be used for the hydrogenation be the same as the solvent used for the polymerization reaction.

In the present invention, there is no particular limitation with respect to the concentration of a polymer solution to be subjected to hydrogenation. However, the polymer concentration of the polymer solution is preferably from 1 to 90 wt %, more preferably from 2 to 60 wt %, most preferably from 5 to 40 wt %.

When the polymer concentration of the polymer solution is lower than the above-mentioned range, the operation for hydrogenation becomes inefficient and disadvantageous from an economical point of view. On the other hand, when the concentration of the polymer solution is higher than the above-mentioned range, the viscosity of the polymer solution becomes high, leading to a lowering of the reaction rate.

In the present invention, the reaction temperature for hydrogenation can be appropriately selected, but is generally from $-78°$ C. to $500°$ C., preferably from $-10°$ C. to $300°$ C., more preferably from $20°$ C. to $250°$ C.

When the reaction temperature is lower than the above-mentioned range, a satisfactorily high reaction rate cannot be achieved. On the other hand, when the reaction temperature is higher than the above-mentioned range, disadvantages are likely to be caused such that not only is the hydrogenation catalyst deactivated, but also the polymer is deteriorated.

The pressure of the hydrogenation reaction system is generally from 0.1 to 500 kg/cm$^2$G, preferably from 1 to 400 kg/cm$^2$G, more preferably from 2 to 300 kg/cm$^2$G.

When the pressure of the hydrogenation reaction system is lower than the above-mentioned range, a satisfactorily high reaction rate cannot be achieved. When the pressure is higher than the above-mentioned range, the reaction rate becomes high, but an expensive pressure-resistant reaction apparatus is required, which is economically disadvantageous. Further, such a high pressure may cause hydrocracking of the polymer during the hydrogenation reaction.

The reaction time for hydrogenation is not particularly limited, and may vary depending on the type and amount of the hydrogenation catalyst, the concentration of the polymer solution, and the temperature and pressure of the reaction system. However, the reaction time for hydrogenation is generally from 5 minutes to 240 hours.

If desired, after completion of the hydrogenation reaction, the hydrogenation catalyst can be recovered from the resultant hydrogenation reaction mixture by a conventional method, such as adsorption-separation of the catalyst by means of an adsorbent, or removal of the catalyst by washing with water or a lower alcohol in the presence of an organic acid and/or an inorganic acid.

The separation and recovery of the hydrogenated cyclic conjugated diene polymer from the hydrogenation reaction mixture can be conducted by a conventional method which is generally used for recovering a conventional polymer from a hydrogenation reaction mixture.

Examples of such conventional methods include a steam-coagulation method comprising directly contacting a hydrogenation reaction mixture with steam; a precipitation method comprising adding a poor solvent for a polymer to a hydrogenation reaction mixture, thereby precipitating the polymer; a method comprising heating a hydrogenation reaction mixture in a hydrogenation reactor, thereby distilling off the solvent; and a method comprising extruding a hydrogenation reaction mixture using an extruder having a vent, while distilling off a solvent through the vent, thereby obtaining a pelletized polymer. A most appropriate method can be selected depending on the properties of the cyclic conjugated diene polymer to be hydrogenated and the solvent used.

When a non-modified cyclic monomer unit-containing polymer in the present invention has a carbon-to-carbon unsaturated bond, if desired, an addition reaction other than hydrogenation may be performed at the carbon-to-carbon unsaturated bond using a conventional technique.

For example, the above-mentioned addition reaction other than hydrogenation can be conducted by adding at least one substituent to the non-modified cyclic monomer unit-containing polymer using a conventional reactive reagent. Examples of substituents (group 1 substituents) include a halogen, such as iodine or bromine, a $C_1$–$C_{20}$ alkyl group, a $C_2$–$C_{20}$ unsaturated aliphatic hydrocarbon group, a $C_5$–$C_{20}$ aryl group, a $C_{3-C20}$ cycloalkyl, a $C_4$–$C_{20}$ cyclodienyl group, and a 5 to 10-membered heterocyclic group containing at least one hetero atom selected from the group consisting of nitrogen, oxygen and sulfur. Further examples of substituents (group 2 substituents) include a hydroxyl group, a thiol group, thiocyanato group, an ether group (derived from an epoxy group or the like), a thioether group, a thiocarboxylic acid group, a formyl group, a carboxyl group, a carbonyl group, an amino group, an imino group, a nitrosyl group, an isocyanato group, sulfonic acid group, a phosphoric acid group, a phosphonic acid group, a phosphinic acid group, and a silyl group. Still further examples of substituents (group 3 substituents) include a hydrocarbon group having at least one substituent of group 2 substituents, which hrdrocarbon group is selected from the group consisting of a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl and a $C_4$–$C_{20}$ cyclodienyl group, and a 5 to 10-membered heterocyclic group having at least one substituent of group 2 substituents, which heterocyclic group contains at least one hetero atom selected from the group consisting of nitrogen, oxygen and sulfur.

The modified cyclic monomer unit-containing polymer used in the present invention is represented by the following formula (1'):

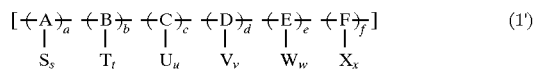
(1')

wherein A to F and a to f are as defined for the formula (1).

As already mentioned above, in the formula (1'), each of S to X, which are modifying groups and which are the same or different, is independently a functional group or an organic compound residue containing the functional group, in which the functional group contains at least one member selected from the group consisting of oxygen (O), nitrogen (N), sulfur (S), silicon (Si), phosphorus (P) and halogen including fluorine (F), chlorine (Cl), bromine (Br) and iodine (I).

Further, in the formula (1'), s to x are, respectively, weight percentages of modifying groups S to X, based on the weight of the polymer, and satisfy the following requirements:

0<s+t+u+v+w+x<100, and

0≦s, t, u, v, w, x≦100.

With respect to a method for conducting an addition reaction to bond the functional group or the organic compound residue containing the functional group to a cyclic monomer unit-containing polymer which is a starting material for the modified polymer used in the present invention, any conventional methods can be employed, in which the cyclic monomer unit-containing polymer to be subjected to an addition reaction may be in the form of a polymer solution, a molten polymer or a solid polymer. Examples of such methods include a method comprising bonding the functional group or the organic compound residue containing the functional group to the cyclic monomer unit-containing polymer by an ene reaction; a method comprising bonding the functional group or the organic compound residue containing the functional group to the cyclic monomer unit-containing polymer by a radical reaction in the presence of or in the absence of a radical initiator; and a method comprising forming a cyclic monomer unit-containing polymer having active terminals by, for example, a living anionic polymerization reaction, and bonding the functional group or the organic compound residue containing the functional group to one or both active terminals of the polymer. Of these methods, a preferable method can be appropriately selected.

In the present invention, the content of the functional group or the organic compound residue containing the functional group in the modified cyclic monomer unit-containing polymer is generally within the range of from 0.001 wt % to less than 100 wt %, preferably from 0.005 to 80 wt %, more preferably 0.01 to 50 wt %, especially preferably from 0.05 to 40 wt %. Further, the most preferred range is from 0.1 to 20 wt %.

Preferred examples of functional groups to be bonded to the cyclic monomer-containing polymer or functional groups contained in the organic compound residue include a hydroxyl group, an ether group, an epoxy group, a carboxylic acid group, an ester group, a carboxylate group, an acid anhydride group, an acid halide group, an aldehyde group, a carbonyl group, an amino group, an amido group, an imido group, an imino group, an oxazoline group, a hydrazine group, a hydrazido-group, an amidine group, a nitrile group, a nitro group, an isocyano group, a cyanato group, an isocyanato group, a silyl group, a silyl ester group, a silyl ether group, a silanol group, a thiol group, a sulfide group, a thiocarboxylic acid group, a dithiocarboxylic acid group, a sulfonic acid group, a sulfinic acid group, a sulfenic acid group, a thiocyanato group, an isothiocyanato group, a thioaldehyde group, a thioketone group, a phosphoric acid group, a phosphonic acid group and a phosphinic acid group.

Especially preferred examples of functional groups to be bonded to the cyclic monomer-containing polymer or functional groups contained in the organic compound residue include a hydroxyl group, an epoxy group, a carboxylic acid group, an ester group, a carboxylate group, an acid anhydride group, an amino group, an amido group, an imido group, an imino group, an oxazoline group, a hydrazine group, a hydrazido group, an isocyano group, a cyanato group, an isocyanato group, a silyl group, a silyl ester group, a silyl ether group, a silanol group, a thiol group, a sulfide group, a thiocarboxylic acid group and a sulfonic acid group. These functional groups or organic compound residues containing these functional groups can be used individually or in combination.

Representative examples of organic compounds, which contain at least one modifying group selected from the group consisting of a functional group and an organic compound residue containing the functional group, and which can be used to bond the at least one modifying group to the cyclic monomer unit-containing polymer by an addition reaction, include acrylic acid, methacrylic acid, a metal salt of acrylic acid, a metal salt of methacrylic acid, methyl acrylate, methyl methacrylate, ethyl methacrylate, ethyl acrylate, maleic acid, dimethyl maleate, diethyl maleate, succinic acid, dimethyl succinate, diethyl succinate, fumaric acid, dimethyl fumarate, diethyl fumarate, itaconic acid, citraconic acid, Hi-mic acid, crotonic acid, mesaconic acid, sorbic acid, tetrahydrophthalic acid, methyltetrahydrophthalic acid, endo-cis-bicyclo[2,2,1]hepto-5-ene-2,3-dicarboxylic acid, methyl-bicyclo[2,2,1]hepto-5-ene-2,3-dicarboxylic acid, maleic anhydride, trimellitic anhydride, pyromellitic anhydride, succinic anhydride, itaconic anhydride, citraconic anhydride, Hi-mic acid anhydride, phthalic anhydride, tetrahydrophthalic anhydride, methyl tetrahydrophtalic anhydride, maleimide, succinimide, phthalimide, glycidyl methacylate, glycidyl acrylate, glycidyl maleate, glycidyl succinate, glycidyl fumarate, glycidyl p-styrenecarboxylate; styrene-p-glicidyl ether; 3,4-epoxy-1-butene; 3,4-epoxy-3-methyl-1-butene; 3,4-epoxy-1-pentene; 3,4-epoxy-3-methyl-1-pentene and 5,6-epoxy-1-hexene, vinylalkoxysilane (examples of alkoxy moieties include methoxy, ethoxy and butoxy), epoxyalkoxysilane (examples of alkoxy moieties include methoxy, ethoxy and butoxy), aminoalkoxysilane (examples of alkoxy moieties include methoxy, ethoxy and butoxy), a diisocyanate compound and an oxazoline compound.

In the present invention, among organic compounds which contain at least one modifying group selected from the group consisting of a functional group and an organic compound residue containing the functional group and which can be used to bond the at least one modifying group to the cyclic monomer unit-containing polymer by an addition reaction, maleic anhydride and glycidyl methacrylate are most preferred from a commercial point of view.

The above-mentioned organic compounds may be used individually or in combination.

As mentioned above, the resin composition of the present invention comprises (α) at least one polymer selected from the group consisting of a non-modified cyclic monomer unit-containing polymer represented by the formula (1) and a modified cyclic monomer unit-containing polymer represented by the formula (1'), and (β) at least one polymer other than the polymer (α), wherein the polymer (α) is present in an amount of at least 1% by weight, based on the total weight of the polymer (α) and the polymer (β), and the polymer (α) has a number average molecular weight of from 10,000 to 5,000,000.

In the resin composition of the present invention, when the weight of polymer (α) and the weight of polymer (β) based on the total weight of the polymer (α) and the polymer (β) are, respectively, represented by α and β, the polymer (α) and the polymer (β) are generally used in a weight ratio [in terms of the weight percentage of polymer (α)] which satisfies the requirement 1≦α/(α+β)<100, preferably 1<α/(α+β)<100, more preferably 2≦α/(α+β)≦99, still more preferably 5≦α/(α+β)≦95.

When the resin composition is used as an industrial material, it is most preferred that the requirement 10≦α/(α+β)≦90 be satisfied.

When the amount ratio of polymer (α) to the total of the polymer (α) and the polymer (β) is outside the range as defined above, a resin composition having satisfactorily improved mechanical properties cannot be obtained.

In the resin composition of the present invention, the polymer (β) may be a customary thermoplastic resin or a customary curable resin, and a thermoplastic resin is preferred. With respect to the types of thermoplastic resin and curable resin, there is no particular limitation.

Examples of thermoplastic resins to be employed as polymer (β) include an olefin polymer, a styrene polymer, a conjugated diene polymer, a hydrogenated conjugated diene polymer, a (meth)acrylate polymer, a (meth)acrylonitrile polymer, a halogenated vinyl polymer, an ester polymer, an ether polymer, an amide polymer, an imide polymer, a sulfide polymer, a sulfone polymer and a ketone polymer. Of these, an olefin polymer, a styrene polymer, a conjugated diene polymer, a hydrogenated conjugated diene polymer, an ester polymer, an ether polymer, an amide polymer and a sulfide polymer are preferred.

Examples of curable resins to be employed as polymer (β) include an unsaturated polyester resin, a urea resin, a melamine resin, a urethane resin and a phenol resin.

As polymer (β) in the resin composition of the present invention, the above-mentioned thermoplastic resins and curable resins can be used individually or in the form of a mixture thereof.

Specific examples of polymer (β) include olefin polymers, such as a polyethylene (PE), a copolymer of ethylene with norbornene or a derivative thereof, a polypropylene (PP), an ethylene-propylene copolymer (such as EP or EP rubber), an ethylene-propylene-diene copolymer (EPDM), a poly-1-butene, a poly-1-pentene, a poly-1-hexene, a poly-1-octene, a polyisobutylene, a polymethyl-1-butene, and a poly-4-methyl-1-pentene; styrene polymers, such as a polystyrene (PSt), a syndiotactic polystyrene (s-PSt) a styrene-acrylic acid copolymer, a styrene-maleic anhydride copolymer (SMA), ABS resin, and AES resin; conjugated diene polymers, such as a polybutadiene (PBd), a polyisoprene (PIp), a conjugated diene copolymer of a block, a graft, a taper or a random configuration [e.g., a butadiene-isoprene copolymer, a styrene-butadiene copolymer (such as SB or SBS), a propylene-butadiene copolymer, a styrene-isoprene copolymer (such as SI or SIS), an α-methylstyrene-butadiene copolymer, an α-methylstyrene-isoprene copolymer, an acrylonitryle-butadiene copolymer, an acrylonitryle-isoprene copolymer, a butadiene-methyl methacrylate copolymer, and an isoprene-methyl methacrylate copolymer] and hydrogenated products thereof (such as SEBS), (meth)acrylate polymers, such as a polymethyl (meth)acrylate (PMMA), a polyethyl (meth)acrylate, a polybutyl (meth)acrylate, a poly(meth)acrylamide; (meth) acrylonitrile polymers, such as a poly(meth)acrylonitrile; halogenated vinyl polymers, such as a polyvinyl halide, a polyvinylidene halide; ester polymers, such as a polybutylene terephthalate (PBT), a polyethylene terephthalate (PET), a polycarbonate (PC), a polyarylate (PAR), and a liquid crystal polyester (LCP); ether polymers, such as a polyacetal (POM), a polyoxyethylene, polyphenylene ether (PPE); aliphatic polyamides, such as a nylon 4, a nylon 6, a nylon 8, a nylon 9, a nylon 10, a nylon 11, a nylon 12, a nylon 46, a nylon 66, a nylon 610, a nylon 612, a nylon 636, a nylon 1212; semi-aromatic polyamides, such as a nylon 4T(T:terephthalic acid), a nylon 4I(I:isophthalic acid), a nylon 6T, a nylon 6I, a nylon 12T, a nylon 12I and a nylon MXD6(MXD:metaxylylenediamine); copolymers or polymer blends of the above-mentioned aliphatic polyamides and semi-aromatic polyamides; imide polymers, such as a polyimide(PI) and a polyamideimide(PAI); sulfide polymers, such as a polyphenylene sulfide(PPS); sulfone polymers, such as a polysulfone(PSF), polyethersulfone (PES), ketone polymers, such as a polyetherketone(PEK), polyetheretherketone(PEEK); unsaturated polyesters, such as a polydiarylpthalate and a phenol-formaldehyde copolymer; urea resins, such as an urea-formaldehide resin; melamine resins, such as a polyarylmelamine, a melamine-formaldehyde copolymer; urethane resin; phenol resins, such as a phenol-formaldehyde copolymer.

These polymers can be used individually or in combination.

The polymer (β) used in the present invention is preferably a thermoplastic resin. Especially preferred examples of thermoplastic resins include an olefin polymer, a styrene polymer, a conjugated diene polymer, a hydrogenated conjugated diene polymer, an ester polymer, an ether polymer, an amido polymer and a sulfide polymer.

In the present invention, the most preferred polymer (β), which is used in combination with the polymer (α) (i.e., a non-modified cyclic monomer unit-containing polymer and/or a modified conjugated diene polymer) to obtain the resin composition of the present invention is an olefin polymer or an amido polymer.

With respect to an olefin polymer to be used as polymer (β), it is preferred that the intrinsic viscosity of the olefin polymer, as measured in decalin at a temperature of 135° C., be within the range of from 0.1 to 100 (liter/g), more preferably from 0.5 to 50 (liter/g), most preferably from 1 to 10 (liter/g).

Among the olefin polymers having an intrinsic viscosity value within the above-mentioned range, crystalline polyolefins are preferred. Especially, a polyethylene (PE), a polypropylene (PP) are preferred.

Specific examples of PE and PP include a high-density polyethylene (HDPE), a medium density polyethylene (MDPE), a low density polyethylene (LDPE), a linear low density polyethylene (LLDPE), an ethylene-propylene copolymer (EP) and a propylene-1-butene copolymer.

It is preferred that the crystallinity of these crystalline polyolefines, as measured by X-ray diffraction, be 30% or more, more preferably 50% or more, still more preferably 70% or more.

On the other hand, with respect to an amido polymers to be used as polymer (β), it is preferred that the intrinsic viscosity [η], as measured in 96% $H_2SO_4$ at a temperature of 25° C., be within the range of from 0.1 to 100 (liter/g), more preferably from 0.5 to 50 (liter/g), most preferably from 1 to 10 (liter/g).

Among the amide polymers having an intrinsic viscosity value within the above-mentioned range, crystalline polyamides are preferred. Specific examples of crystalline polyamides include a crystalline polyamide obtained by a polymerization of at least one member selected from a group consisting of a reaction product of a diamine with a dicarboxylic acid, a lactam, and an amino acid.

Preferred examples of crystalline polyamides include aliphatic polyamides, such as a nylon 6, a nylon 6·66, a nylon 11, a nylon 12, a nylon 46, a nylon 66, a nylon 610, a nylon 612, a nylon 1212; semi-aromatic polyamides, such as a nylon 4T·4I (T:terephtalic acid, I:isophtalic acid), a nylon 6·6T, a nylon 66·6T, a nylon 6I, a nylon 6T·6I, a nylon MXD6 (MXD:metaxylylenediamine); and copolymers or polymer blends of these aliphatic polyamides and semi-aromatic polyamides.

For stabilizing the morphology of the resin composition of the present invention, it is preferred that the resin composition contain, as polymer (α), a modified cyclic monomer unit-containing polymer having at least one functional group selected from the group consisting of a hydroxyl group, an epoxy group, a carboxylic acid group, an ester group, a carboxylate group, an acid anhydride group, an amino group, an amido group, an imido group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic acid group, and/or an organic compound residue containing the above-mentioned functional group, and, as polymer (β), a polymer having a functional group capable of forming a covalent bond with the above-mentioned functional group of polymer (α), so that a reaction product of the polymer (α) with the polymer (β) is formed.

Examples of polymer (β) having a functional group capable of forming a covalent bond with the functional group of the polymer (α) include an ester polymer (which has ester groups and may further have another functional group, such as a hydroxyl group and a carboxyl group), an ether polymer (which has ether groups and may further have another functional group, such as a hydroxyl group), an amide polymer (which has amido groups and may further have another functional group, such as an amino group and a carboxyl group) and a sulfide polymer (which has sulfide groups and may further have another functional group, such as a thiol group).

Further examples of polymer (β) having a functional group capable of forming a covalent bond with the functional group of the polymer (α) include a modified polymer (selected from the group consisting of a modified olefin polymer, a modified styrene polymer, a modified conjugated diene polymer, a modified hydrogenated conjugated diene polymer, a modified ether polymer and a modified sulfide polymer) having at least one functional group selected from the group consisting of a hydroxyl group, an epoxy group, a carboxylic acid group, an ester group, a carboxylate group, an acid anhydride group, an amino group, an amido group, an imido group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic acid group, or having an organic compound residue containing the above-mentioned functional group.

The reaction product of the polymer (α) with the polymer (β) may generally be present in the resin composition in an amount of 0.001 to 100% by weight, preferably 0.005 to 90% by weight, more preferably 0.01 to 70% by weight, based on the weight of the resin composition. For simultaneously achieving stability, mechanical properties and mold-processability (fluidity) of the resin composition, it is most preferred that the reaction product be present in the resin composition in an amount of 0.01 to 50% by weight.

The resin composition of the present invention can be obtained by mixing (i.e., alloying or blending by a conventional technique) the polymer (α) which is at least one polymer selected from the group consisting of a non-modified cyclic monomer unit-containing polymer and a modified cyclic monomer unit-containing polymer with at least one polymer (β) which is at least one polymer other than the polymer (α).

Examples of methods for blending the polymer (α) and the polymer (β) include a method which comprises solution blending the polymers using a single solvent and a method which comprises melt blending the polymers using an extruder, a kneader, Brabender, Banbury mixer or the like. The method can be appropriately selected, depending on the intended use of the resin composition to be obtained.

In the production of the resin composition of the present invention, various customary additives or reinforcing materials to be added to or blended with conventional polymer materials can be used in amounts which are usually used in the production of conventional resin compositions, depending on the intended use of the resin composition to be produced. Examples of such additives and reinforcing materials include stabilizers, such as a thermal stabilizer, an antioxidant and an ultraviolet absorbing agent, a lubricant, a nucleator, a plasticizer, a coloring agent, a pigment, a crosslinking agent, a foaming agent, an antistatic agent, an anti-slip agent, an antiblocking agent, a tackifier, a mold-release agent, an organic reinforcing material (e.g., aramid, polyimide, polybenzoxazole and polybenzothiazol) and an inorganic reinforcing material (e.g., a short glass fiber, a long glass fiber, a glass wool, a milled glass fiber, a glass bead, a glass balloon, a carbon fiber, a metallic fiber, a mineral fiber, such as a rock wool, a ceramic fiber or a titanium whisker, and an inorganic filler, such as talc, mica, wollastonite, kaolin or montmorillonite).

The resin composition of the present invention can be advantageously used as an excellent industrial material in various fields, such as for automobile parts, electric and electronic parts, railroad parts, aircraft parts, clothes, medical equipment parts, packing materials for drugs and foods and materials for general miscellaneous goods. In these fields, the resin composition of the present invention can be used as plastics, elastomers, fibers, sheets, films, materials for parts for machines, containers, packing materials, tires and belts, insulating materials and adhesives.

BEST MODE FOR CARRYING OUT THE INVENTION

Hereinbelow, the present invention will be described in more detail with reference to the following Reference Examples, Examples and Comparative Examples, but they should not be construed as limiting the scope of the present invention.

In the Reference Examples, with respect to chemicals, those which have most high purity among the commercially available ones were used. With respect to solvents, commercially available solvents were treated by a conventional method before use. That is, the solvents were degassed, dehydrated under reflux over an activated metal in an atmosphere of an inert gas, and purified by distillation.

The number average molecular weight ($\overline{Mn}$) and the weight average molecular weight ($\overline{Mw}$) were measured by G.P.C. (gel permeation chromatography), using a calibration curve obtained with respect to standard polystyrene samples.
(Methods for measuring properties of resin compositions)

(1) Tensile test (⅛ inch):

The tensile strength (TS), the tensile elongation (TE) and the tensile modulus (TM) of a ⅛-inch thick test specimen of a resin composition were measured in accordance with ASTM D638.

(2) Flexural test (⅛ inch):

The flexural strength (FS) and the flexural modulus (FM) of a ⅛-inch thick test specimen of a resin composition were measured in accordance with ASTM D790.

(3) Izod impact test:

The Izod impact strength of a resin composition was measured in accordance with ASTM D256 (at room temperature).

(4) Heat distortion temperature (HDT:°C.):

The heat distortion temperature of a resin composition was measured under a load of 1.82 MPa (high load) and under a load of 0.45 MPa (low load) in accordance with ASTM D648.

In the above measurements, the following is to be noted.

1 MPa=10.20 kg·f/cm$^2$; and

1 J/m=0.102 kg·cm/cm).

REFERENCE EXAMPLE 1

(Preparation of polymerization catalyst 1)

In an atmosphere of dried argon gas, a given amount of tetramethylethylenediamine (TMEDA) was dissolved in a mixed solvent of cyclohexane and n-hexane having a cyclohexane/n-hexane ratio of 9/1 (V/V). The resultant solution was cooled to and maintained at −10° C. Then, in the atmosphere of dried argon gas, an n-hexane solution of n-butyllithium (n-BuLi) was gradually added to the solution of TMEDA in cyclohexane/n-hexane in an amount such as would provide a TMEDA/n-BuLi molar ratio of 1/4. As a result, polymerization catalyst 1 (a complex of TMEDA with n-BuLi) was obtained.

[Production of polymer 1]

A well dried 5-liter high-pressure autoclave having an electromagnetic induction agitator was purged with dried nitrogen gas by a conventional method.

2,800 g of cyclohexane and 400 g of 1,3-cyclohexadiene were charged in the autoclave. Polymerization catalyst 1 (a complex of TMEDA with n-BuLi) was added to the autoclave in an amount of 10.50 mmol in terms of the amount of lithium atom. A polymerization reaction was conducted at 30° C. for 8 hours. After that period of time, 1-heptanol was added to the resultant reaction mixture, to thereby terminate the polymerization reaction.

To the reaction mixture was added a stabilizing agent [Irganox B215 (0037HX), manufactured and sold by CIBA GEIGY, Switzerland] and then, removal of the solvent was conducted by a conventional method, to thereby obtain a cyclohexadiene homopolymer.

The number average molecular weight ($\overline{Mn}$) of the obtained homopolymer was 49,000. The molecular weight distribution ($\overline{Mw}/\overline{Mn}$) was 1.19.

The glass transition temperature (Tg) of the homopolymer was 120° C. The tensile modulus (TM) was 4,250 MPa as measured in accordance with ASTM D638.

100 Parts by weight of the cyclohexadiene homopolymer, 3 parts by weight of maleic anhydride and 1 part by weight of Parhexa 25B (manufactured and sold by Nippon Oil and Fats Co., Ltd., Japan) were mixed in a 30 mmø twin screw extruder having an L/D ratio of 17 (PCM30 manufactured and sold by Ikegai Corporation, Japan) at a temperature of 280° to 300° C., followed by extrusion. The resultant extrudate was pelletized, to thereby obtain a desired product (polymer 1).

The obtained polymer 1 was subjected to extraction using hot acetone, to thereby remove the unreacted maleic anhydride, and then dried in vacuo at 80° C. The amount of maleic anhydride grafted on the cyclohexadiene homopolymer was measured by titration using sodium methylate. As a result, it was found that the amount of maleic anhydride grafted on the cyclohexadiene homopolymer was 0.4 mol %.

REFERENCE EXAMPLE 2

[Production of polymer 2]

A well dried 5-liter high-pressure autoclave having an electromagnetic induction agitator was purged with dried nitrogen gas by a conventional method.

2,800 g of cyclohexane and 400 g of 1,3-cyclohexadiene were charged in the autoclave. Then, a polymerization catalyst (a complex of TMEDA with n-BuLi) obtained in the same manner as in Reference Example 1 was added to the autoclave in an amount of 10.50 mmol in terms of the amount of lithium atom. A polymerization reaction was conducted at 30° C. for 8 hours, to thereby obtain a cyclohexadiene homopolymer. After that period of time, 1-heptanol was added to the resultant reaction mixture, to thereby terminate the polymerization reaction.

To the reaction mixture was added a hydrogenation catalyst comprised of cobalt trisacetylacetonato [Co(acac)$_3$] and triisobutylaluminum (TIBAL) [Co(acac)$_3$/TIBAL molar ratio: 1/6], in an amount of 100 ppm, in terms of the amount of cobalt atom, based on the weight of the polymer.

The autoclave was purged with hydrogen gas. The temperature in the autoclave was elevated to 185° C. A hydrogenation reaction was conducted under a hydrogen pressure of 50 kg/cm$^2$·G for 4 hours.

After completion of the hydrogenation reaction, the autoclave was cooled to room temperature, and the pressure in the autoclave was lowered to atmospheric pressure. The autoclave was purged with nitrogen gas, and TIBAL was treated, using a conventional technique, by adding methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated cyclohexadiene homopolymer.

Results of the measurement by $^1$H-NMR showed that the degree of hydrogenation of the cyclohexene rings in the polymer chain structure of the cyclohexadiene homopolymer was 100 mol %. The number average molecular weight ($\overline{Mn}$) of the hydrogenated cyclohexadiene homopolymer was 50,700. The molecular weight distribution ($\overline{Mw}/\overline{Mn}$) of the hydrogenated cyclohexadiene homopolymer was 1.15.

The glass transition temperature (Tg) of the homopolymer was 221° C. The tensile modulus (TM) was 6,520 MPa as measured in accordance with ASTM D638.

100 Parts by weight of the hydrogenated cyclohexadiene homopolymer, 3 parts by weight of maleic anhydride and 1 part by weight of Parhexa 25B (manufactured and sold by Nippon Oil and Fats Co., Ltd., Japan) were mixed in a 30 mmø twin screw extruder having an L/D ratio of 17 (PCM30 manufactured and sold by Ikegai Corporation, Japan) at a temperature of 300° to 320° C., followed by extrusion. The resultant extrudate was pelletized, to thereby obtain a desired product (polymer 2).

The obtained polymer 2 was subjected to extraction using hot acetone, to thereby remove the unreacted maleic anhydride, and then dried in vacuo at 80° C. The amount of maleic anhydride grafted on the hydrogenated cyclohexadiene homopolymer was measured by titration using sodium methylate. As a result, it was found that the amount of maleic anhydride grafted on the hydrogenated cyclohexadiene homopolymer was 0.2 mol %.

REFERENCE EXAMPLE 3

[Production of polymer 3]

A well dried 5-liter high-pressure autoclave having an electromagnetic induction agitator was purged with dried nitrogen gas by a conventional method.

2,800 g of cyclohexane and 60 g of 1,3-cyclohexadiene were charged in the autoclave. A polymerization catalyst (a complex of TMEDA with n-BuLi) obtained in the same manner as in Reference Example 1 was added to the autoclave in an amount of 10.50 mmol in terms of the amount of lithium atom. A polymerization reaction was conducted at 30° C. for 4 hours, to thereby obtain a cyclohexadiene homopolymer. Subsequently, 280 g of butadiene was charged in the autoclave, and a polymerization reaction was further conducted at 45° C. for 1 hour to thereby obtain a cyclohexadiene-butadiene diblock copolymer. To the resultant reaction mixture was added 60 g of 1,3-cyclohexadiene. A polymerization reaction was conducted at 30° C. for 4 hours to thereby obtain a cyclohexadiene-butadiene triblock copolymer.

After that period of time, 1-heptanol was added to the resultant reaction mixture, to thereby terminate the polymerization reaction.

To the reaction mixture was added a hydrogenation catalyst comprised of titanocene ditolyl and n-BuLi (titanocene ditolyl/n-BuLi molar ratio: 1/1) in an amount of 250 ppm, in terms of the amount of titanium atom, based on the weight of the polymer. The autoclave was purged with hydrogen gas. The temperature in the autoclave was elevated to 75° C. A hydrogenation reaction was conducted under a hydrogen pressure of 10 kg/cm$^2$·G for 30 minutes.

After completion of the hydrogenation reaction, the autoclave was cooled to room temperature, and the pressure in the autoclave was lowered to atmospheric pressure. The autoclave was purged with nitrogen gas, and n-BuLi was treated, using a conventional technique, by adding methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated cyclohexadiene-butadiene triblock copolymer exhibiting a rubber elasticity (polymer 3).

Results of the measurement by $^1$H-NMR showed that the degree of hydrogenation of the cyclohexadiene polymer block was 0 mol %. With respect to both of the 1,2-vinyl bond segment and 1,4-bond segment of the butadiene polymer block, the degree of hydrogenation was 100 mol %. The number average molecular weight ($\overline{Mn}$) of the obtained hydrogenated triblock copolymer was 96,500. The molecular weight distribution ($\overline{Mw}/\overline{Mn}$) was 1.09.

The tensile strength (TS) of the copolymer was 16.80 MPa. The tensile elongation (TE) was 750%.

REFERENCE EXAMPLE 4

[Production of polymer 4]

A well dried 5-liter high-pressure autoclave having an electromagnetic induction agitator was purged with dried nitrogen gas by a conventional method.

2,800 g of cyclohexane and 60 g of 1,3-cyclohexadiene were charged in the autoclave. A polymerization catalyst (a complex of TMEDA with n-BuLi) obtained in the same manner as in Reference Example 1 was added to the autoclave in an amount of 15.50 mmol in terms of the amount of lithium atom. A polymerization reaction was conducted at 30° C. for 4 hours, to thereby obtain a cyclohexadiene homopolymer. Subsequently, 280 g of butadiene was charged in the autoclave, and a polymerization reaction was further conducted at 60° C. for 60 minutes to thereby obtain a cyclohexadiene-butadiene diblock copolymer. To the resultant reaction mixture was added 60 g of 1,3-cyclohexadiene. A polymerization reaction was conducted at 30° C. for 5 hours to thereby obtain a cyclohexadiene-butadiene triblock copolymer.

After that period of time, 1-heptanol was added to the resultant reaction mixture, to thereby terminate the polymerization reaction.

To the reaction mixture was added a hydrogenation catalyst comprised of titanocene ditolyl and n-BuLi (titanocene ditolyl/n-BuLi molar ratio: 1/1) in an amount of 100 ppm, in terms of the amount of titanium atom, based on the weight of the polymer. The autoclave was purged with hydrogen gas. The temperature in the autoclave was elevated to 75° C. A hydrogenation reaction was conducted under a hydrogen pressure of 10 kg/cm$^2$·G for 30 minutes.

After completion of the hydrogenation reaction, the autoclave was cooled to room temperature, and the pressure in the autoclave was lowered to atmospheric pressure. The autoclave was purged with nitrogen gas, and n-BuLi was treated, using a conventional technique, by adding methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated cyclohexadiene-butadiene triblock copolymer exhibiting a rubber elasticity (polymer 4).

Results of the measurement by $^1$H-NMR showed that the degree of hydrogenation of the cyclohexadiene polymer block was 0 mol %. With respect to both of the 1,2-vinyl bond segment and 1,4-bond segment of the butadiene polymer block, the degree of hydrogenation was 100 mol %. The number average molecular weight ($\overline{Mn}$) of the obtained hydrogenated triblock copolymer was 77,600. The molecular weight distribution ($\overline{Mw}/\overline{Mn}$) was 1.12.

The tensile strength (TS) of the copolymer was 27.50 MPa. The tensile elongation (TE) was 600%.

REFERENCE EXAMPLE 5

100 Parts by weight of polymer 3 (a hydrogenated cyclohexadiene-butadiene triblock copolymer) which was obtained in Reference Example 3, 2 parts by weight of maleic anhydride and 0.5 part by weight of Parhexa 25B (manufactured and sold by Nippon Oil and Fats Co., Ltd., Japan) were mixed in a 30 mmø twin screw extruder having an L/D ratio of 17 (PCM30 manufactured and sold by Ikegai Corporation, Japan) at 250° to 280° C., followed by extrusion. The resultant extrudate was pelletized, to thereby obtain a desired product (polymer 5).

The obtained polymer 5 was subjected to extraction using hot acetone, to thereby remove the unreacted maleic anhydride, and then dried in vacuo at 80° C. The amount of maleic anhydride grafted on the hydrogenated cyclohexadiene-butadiene triblock copolymer was measured by titration using sodium methylate. As a result, it was found that the amount of maleic anhydride grafted on the hydrogenated cyclohexadiene-butadiene triblock copolymer was 1.2 mol %.

REFERENCE EXAMPLE 6

100 Parts by weight of polymer 4 (a hydrogenated cyclohexadiene-butadiene triblock copolymer) obtained in Reference Example 4, 2 parts by weight of maleic anhydride and 0.5 part by weight of Parhexa 25B (manufactured and sold by Nippon Oil and Fats Co., Ltd., Japan) were mixed in a 30 mmø twin screw extruder having an L/D ratio of 17 (PCM30 manufactured and sold by Ikegai Corporation, Japan) at 250° to 280° C., followed by extrusion. The resultant extrude was pelletized, to thereby obtain a desired product (polymer 6).

The obtained polymer 6 was subjected to extraction using hot acetone, to thereby remove the unreacted maleic anhydride, and then dried in vacuo at 80° C. The amount of maleic anhydride grafted on the hydrogenated cyclohexadiene-butadiene triblock copolymer was measured by titration using sodium methylate. As a result, it was found that the amount of maleic anhydride grafted on the hydrogenated cyclohexadiene-butadiene triblock copolymer was 1.4 mol %.

EXAMPLE 1

70 Parts by weight of nylon 66 (Leona® 1402S manufactured and sold by Asahi Chemical Industry Co., Ltd., Japan) and 30 parts by weight of polymer 1 were dry blended and mixed in a 30 mmø twin-screw extruder having an L/D ratio of 17 (PCM-30 manufactured and sold by Ikegai Corporation, Japan) at a temperature of 250° to 280° C., followed by extrusion. The resultant extrudate was pelletized, to thereby obtain a resin composition. The obtained resin composition was subjected to injection molding at 280° C., to thereby obtain a test specimen of the resin composition.

With respect to the obtained test specimen of the resin composition, the tensile strength (TS) was 79.5 MPa, the tensile elongation (TE) was 6%, the flexural strength (FS) was 121.6 MPa, the flexural modulus (FM) was 3,037 MPa, the Izod impact strength (Izod) was 36.7 J/m and the heat distortion temperature (HDT) was 92° C. as measured under a high load.

EXAMPLE 2

70 Parts by weight of nylon 66 (Leona® 1402S manufactured and sold by Asahi Chemical Industry Co., Ltd., Japan) and 30 parts by weight of polymer 2 were dry blended and mixed in a 30 mmø twin-screw extruder having an L/D ratio of 17 (PCM-30 manufactured and sold by Ikegai Corporation, Japan) at a temperature of 290° to 310° C., followed by extrusion. The resultant extrudate was pelletized, to thereby obtain a resin composition. The obtained resin composition was subjected to injection molding at 295° C., to thereby obtain a test specimen of the resin composition.

With respect to the obtained test specimen of the resin composition, the tensile strength (TS) was 83.3 MPa, the tensile elongation (TE) was 5%, the flexural strength (FS) was 125.5 MPa, the flexural modulus (FM) was 3,325 MPa, the Izod impact strength (Izod) was 33.8 J/m and the heat distortion temperature (HDT) was 148° C. as measured under a high load.

EXAMPLE 3

70 Parts by weight of polypropylene (Asahi Chemical Industry Polypropylene M1500® manufactured and sold by Asahi Chemical Industry Co., Ltd., Japan) and 30 parts by weight of polymer 3 were dry blended and mixed in a 30 mmø twin-screw extruder having an L/D ratio of 17 (PCM-30 manufactured and sold by Ikegai Corporation, Japan) at a temperature of 200° to 240° C., followed by extrusion. The resultant extrudate was pelletized, to thereby obtain a resin composition. The obtained resin composition was subjected to injection molding at 230° C., to thereby obtain a test specimen of the resin composition.

With respect to the obtained test specimen of the resin composition, the tensile strength (TS) was 22.5 MPa, the tensile elongation (TE) was 500% or more, the flexural strength (FS) was 27.4 MPa, the flexural modulus (FM) was 853 MPa, the Izod impact strength (Izod) was 716 J/m and the heat distortion temperature (HDT) was 82° C. as measured under a low load.

COMPARATIVE EXAMPLE 1

A polypropylene product which was the same as used in Example 3 for producing the resin composition was provided for evaluation of the properties thereof, and measurement of the properties thereof was done under the same conditions as in Example 3. The tensile strength (TS) was 30.2 MPa, the tensile elongation (TE) was 500% or more, the flexural strength (FS) was 41.6 MPa, the flexural modulus (FM) was 1,245 MPa, the Izod impact strength (Izod) was 12.7 J/m and the heat distortion temperature (HDT) was 68° C. as measured under a low load.

EXAMPLES 4 and 5

In each of Examples 4 and 5, substantially the same procedure as in Example 3 was repeated, except that the amounts of the polypropylene and polymer 3 were changed.

The results of the measurements conducted in Examples 3 to 5 are shown in Table 1, together with the results of the measurement conducted in Comparative Example 1.

TABLE 1

|  | Amount ratio of PP/polymer 3 | TS | FM | Izod |
| --- | --- | --- | --- | --- |
| Example 3 | 70/30 | 22.5 | 853 | 716 |
| Example 4 | 85/25 | 24.8 | 907 | 706 |
| Example 5 | 80/20 | 25.9 | 986 | 695 |
| Comparative Example 1 | PP = 100 | 30.2 | 1245 | 12.7 |

EXAMPLE 6

70 Parts by weight of polypropylene (Asahi Chemical Industry Polypropylene M1500® manufactured and sold by Asahi Chemical Industry Co., Ltd., Japan) and 30 parts by weight of polymer 4 were dry blended and mixed in a 30 mmø twin-screw extruder having an L/D ratio of 17 (PCM-30 manufactured and sold by Ikegai Corporation, Japan) at a temperature of 200° to 240° C., followed by extrusion. The resultant extrudate was pelletized, to thereby obtain a resin composition. The obtained resin composition was subjected to injection molding at 230° C., to thereby obtain a test specimen of the resin composition.

With respect to the obtained test specimen of the resin composition, the tensile strength (TS) was 29.3 MPa, the tensile elongation (TE) was 500% or more, the flexural strength (FS) was 30.3 MPa, the flexural modulus (FM) was 892 MPa, the Izod impact strength (Izod) was 704 J/m and the heat distortion temperature (HDT) was 91° C. as measured under a low load.

EXAMPLE 7

70 Parts by weight of nylon 66 (Leona® 1402S manufactured and sold by Asahi Chemical Industry Co., Ltd., Japan) and 30 parts by weight of polymer 5 were dry blended and mixed in a 30 mmø twin-screw extruder having an L/D ratio of 17 (PCM-30 manufactured and sold by Ikegai Corporation, Japan) at a temperature of 250° to 280° C., followed by extrusion. The resultant extrudate was pelletized, to thereby obtain a resin composition. The obtained resin composition was subjected to injection molding at 280° C., to thereby obtain a test specimen of the resin composition.

With respect to the obtained test specimen of the resin composition, the tensile strength (TS) was 60.5 MPa, the tensile elongation (TE) was 67%, the flexural strength (FS) was 67.6 MPa, the flexural modulus (FM) was 1,840 MPa, the Izod impact strength (Izod) was N.B. (no break) and the heat distortion temperature (HDT) was 62° C. as measured under a high load.

COMPARATIVE EXAMPLE 2

A nylon 66 product which was the same as used in Example 7 for producing the resin composition was provided for evaluation of the properties thereof, and measurement of the properties thereof was done under the same conditions as in Example 7. The tensile strength (TS) was 79.4 MPa, the tensile elongation (TE) was 60%, the flexural strength (FS) was 107.8 MPa, the flexural modulus (FM) was 2,843 MPa, the Izod impact strength (Izod) was 44.1 J/m and the heat distortion temperature (HDT) was 68° C. as measured under a high load.

EXAMPLES 8 and 9

In each of Examples 8 and 9, substantially the same procedure as in Example 7 was repeated, except that the amounts of the nylon 66 (PA) and polymer 5 were changed.

The results of the measurements conducted in Examples 7 to 9 are shown in Table 2, together with the results of the measurement conducted in Comparative Example 2.

TABLE 2

| | Amount ratio of PA/polymer 5 | TS | FM | Izod |
|---|---|---|---|---|
| Example 7 | 70/30 | 60.5 | 1840 | N.B. |
| Example 8 | 85/25 | 61.3 | 1910 | N.B. |
| Example 9 | 80/20 | 64.8 | 1970 | 1090 |
| Comparative Example 2 | PA = 100 | 79.4 | 2843 | 44.1 |

EXAMPLE 10

70 Parts by weight of nylon 66 (Leona® 1402S manufactured and sold by Asahi Chemical Industry Co., Ltd., Japan) and 30 parts by weight of polymer 6 were dry blended and mixed in a 30 mmø twin-screw extruder having an L/D ratio of 17 (PCM-30 manufactured and sold by Ikegai Corporation, Japan) at a temperature of 250° to 280° C., followed by extrusion. The resultant extrudate was pelletized, to thereby obtain a resin composition. The obtained resin composition was subjected to injection molding at 280° C., to thereby obtain a test specimen of the resin composition.

With respect to the obtained test specimen of the resin composition, the tensile strength (TS) was 61.3 MPa, the tensile elongation (TE) was 71%, the flexural strength (FS) was 68.2 MPa, the flexural modulus (FM) was 1,870 MPa, the Izod impact strength (Izod) was 1,080 J/m and the heat distortion temperature (HDT) was 64° C. as measured under a high load.

EXAMPLE 11

70 Parts by weight of polyphenylene sulfide (M2588 manufactured and sold by Toray-Phillips petroleum Co., Ltd., Japan), 30 parts by weight of polymer 2 and 0.5 part by weight of γ-aminopropyltriethoxysilane (A1100 manufactured and sold by NIPPON UNICAR COMPANY, LIMITED, Japan) were dry blended and mixed in a 30 mmø twin-screw extruder having an L/D ratio of 17 (PCM-30 manufactured and sold by Ikegai Corporation, Japan) at a temperature of 300° to 320° C., followed by extrusion. The resultant extrudate was pelletized, to thereby obtain a resin composition. The obtained resin composition was subjected to injection molding at 310° C., to thereby obtain a test specimen of the resin composition.

With respect to the obtained test specimen of the resin composition, the tensile strength (TS) was 81.2 MPa, the tensile elongation (TE) was 7%, the flexural strength (FS) was 128.4 MPa, the flexural modulus (FM) was 3,275 MPa, the Izod impact strength (Izod) was 41.9 J/m and the heat distortion temperature (HDT) was 179° C. as measured under a high load.

REFERENCE EXAMPLE 7
(Preparation of polymerization catalyst 2)

In an atmosphere of dried argon gas, a given amount of tetramethylethylenediamine (TMEDA) was dissolved in a mixed solvent of cyclohexane and n-hexane having a cyclohexane/n-hexane ratio of 9/1 (V/V). The resultant solution was cooled to and maintained at −10° C. Then, in an atmosphere of dried argon gas, an n-hexane solution of n-butyllithium (n-BuLi) was gradually added to the solution of TMEDA in cyclohexane/n-hexane in an amount such as would provide a TMEDA/n-BuLi molar ratio of 1/1. As a result, polymerization catalyst 2 (a complex of TMEDA with n-BuLi) was obtained.

(Production of polymer 7 and polymer 8)

A well dried 100 ml Schlenk tube was purged with dried argon gas by a conventional method. 3.00 g of 1,3-cyclohexadiene and 20.0 g of cyclohexane were charged in the Schlenk tube. While maintaining the temperature of the resultant solution at 25° C., polymerization catalyst 2 was added to the solution in an amount of 0.07 mmol in terms of the amount of lithium atom, and a polymerization reaction was conducted for 5 hours in a dried argon atmosphere.

200 ml of the reaction mixture was transferred to a 200-ml metallic autoclave. To the reaction mixture was added a hydrogenation catalyst comprised of cobalt trisacetylacetonato [Co(acac)$_3$] and triisobutylaluminum (TIBAL) [Co (acac)$_3$/TIBAL molar ratio: 1/6], in an amount of 80 ppm, in terms of the amount of cobalt atom, based on the weight of the polymer.

The autoclave was purged with hydrogen gas and heated to 185° C. A hydrogenation reaction was conducted under a hydrogen pressure of 40 kg/cm$^2$·G for 4 hours.

After completion of the hydrogenation reaction, the autoclave was cooled to room temperature, and the pressure in the autoclave was lowered to atmospheric pressure. The autoclave was purged with nitrogen gas, and TIBAL was treated, using a conventional technique, by adding methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining a hydrogenated cyclohexadiene homopolymer (polymer 7).

Results of the measurement by $^1$H-NMR showed that the degree of hydrogenation of the cyclohexene rings in the polymer chain structure of the cyclohexadiene homopolymer was 100 mol %. That is, the above cyclohexadiene homopolymer had a polymeric molecular chain structure which was comprised solely of cyclohexane rings.

The number average molecular weight ($\overline{Mn}$) of the obtained hydrogenated cyclohexadiene homopolymer was 43,900. The molecular weight distribution ($\overline{Mw}/\overline{Mn}$) was 1.08.

In an atmosphere of dried nitrogen gas, 4.92 g of polymer 7 and 5.88 g of maleic anhydride were added to 150 ml of 1,2,4-trichlorobenzene (TCB) to thereby obtain a mixture. The obtained mixture was heated to 120° C. while stirring, to thereby completely dissolve the hydrogenated cyclohexadiene homopolymer and maleic anhydride in TCB.

To the resultant solution was gradually added 24 mmol of a 50% dilution product of benzoyl peroxide with dioctyl phthalate (Nyper BO, manufactured and sold by Nippon Oil & Fats Co., Ltd., Japan), and in an atmosphere of dried nitrogen gas, a reaction was conducted at 120° C. for 5 hours.

After completion of the reaction, the resultant reaction mixture was subjected to re-precipitation several times using acetone/TCB, to thereby obtain a maleic anhydride-modified hydrogenated cyclohexadiene homopolymer. The modified hydrogenated cyclohexadiene homopolymer was dried at 80° C. in vacuo to thereby obtain a desired product (polymer 8).

The amount of maleic anhydride grafted on the hydrogenated cyclohexadiene homopolymer was measured using sodium methylate. It was found that the amount of maleic anhydride grafted on the hydrogenated cyclohexadiene homopolymer was 1.7 mol %.

EXAMPLE 12

Figure 2:
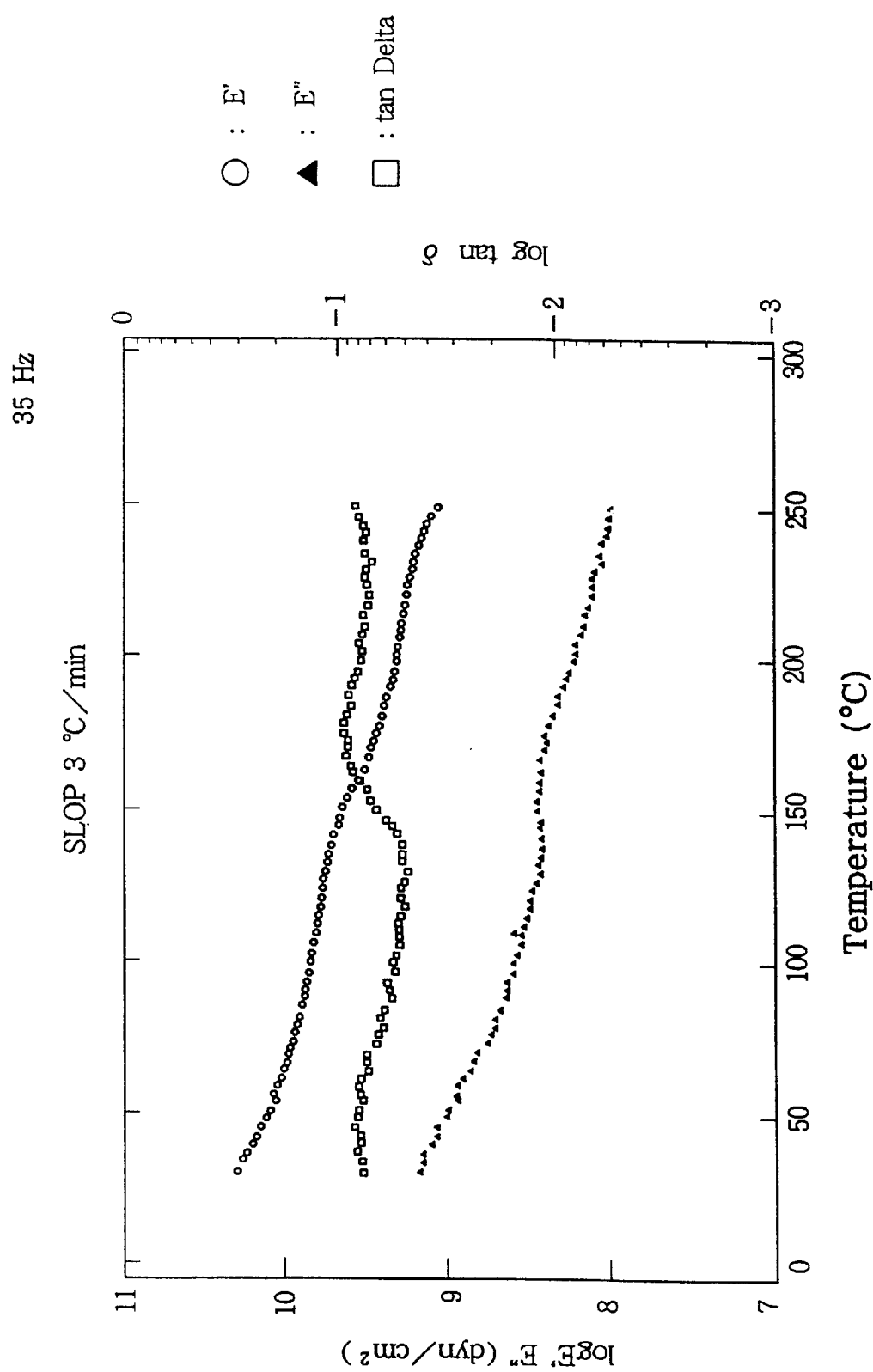
FIG. 2 is a chart showing the viscoelastic spectra of the resin composition of the present invention, obtained in Example 12.

70 Parts by weight of nylon 66 (Leona® 1300S manufactured and sold by Asahi Chemical Industry Co., Ltd., Japan) and 30 parts by weight of polymer 7 were dry blended, and mixed in a Brabender at 300° C. to thereby obtain a resin composition. The obtained resin composition was molded using a compression molding machine which had been heated to 300° C. The viscoelasticity spectra of the obtained resin composition were measured. Results are shown in FIG. 2.

EXAMPLE 13

Figure 3:
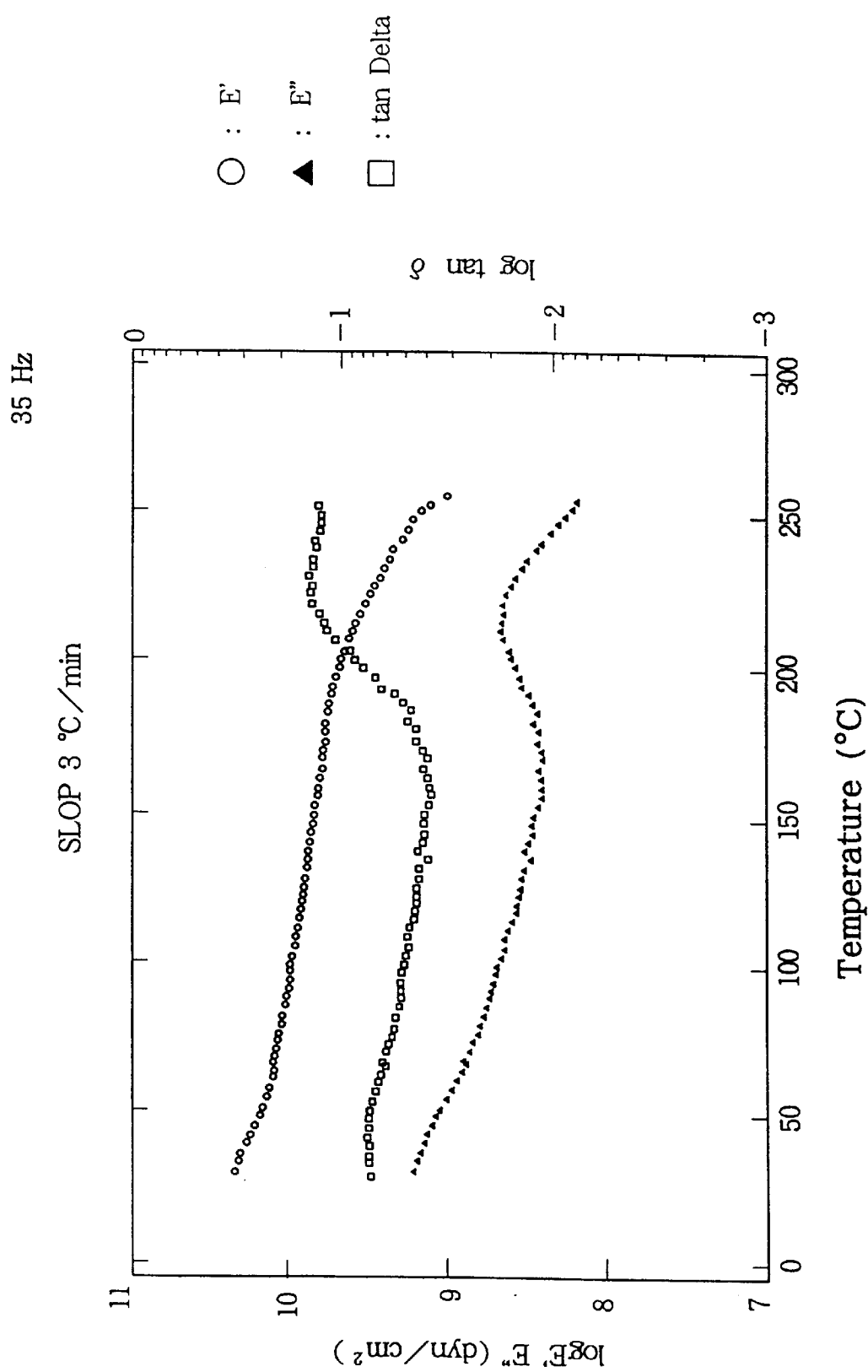
FIG. 3 is a chart showing the viscoelastic spectra of the resin composition of the present invention, obtained in Example 13.
Figure 4:
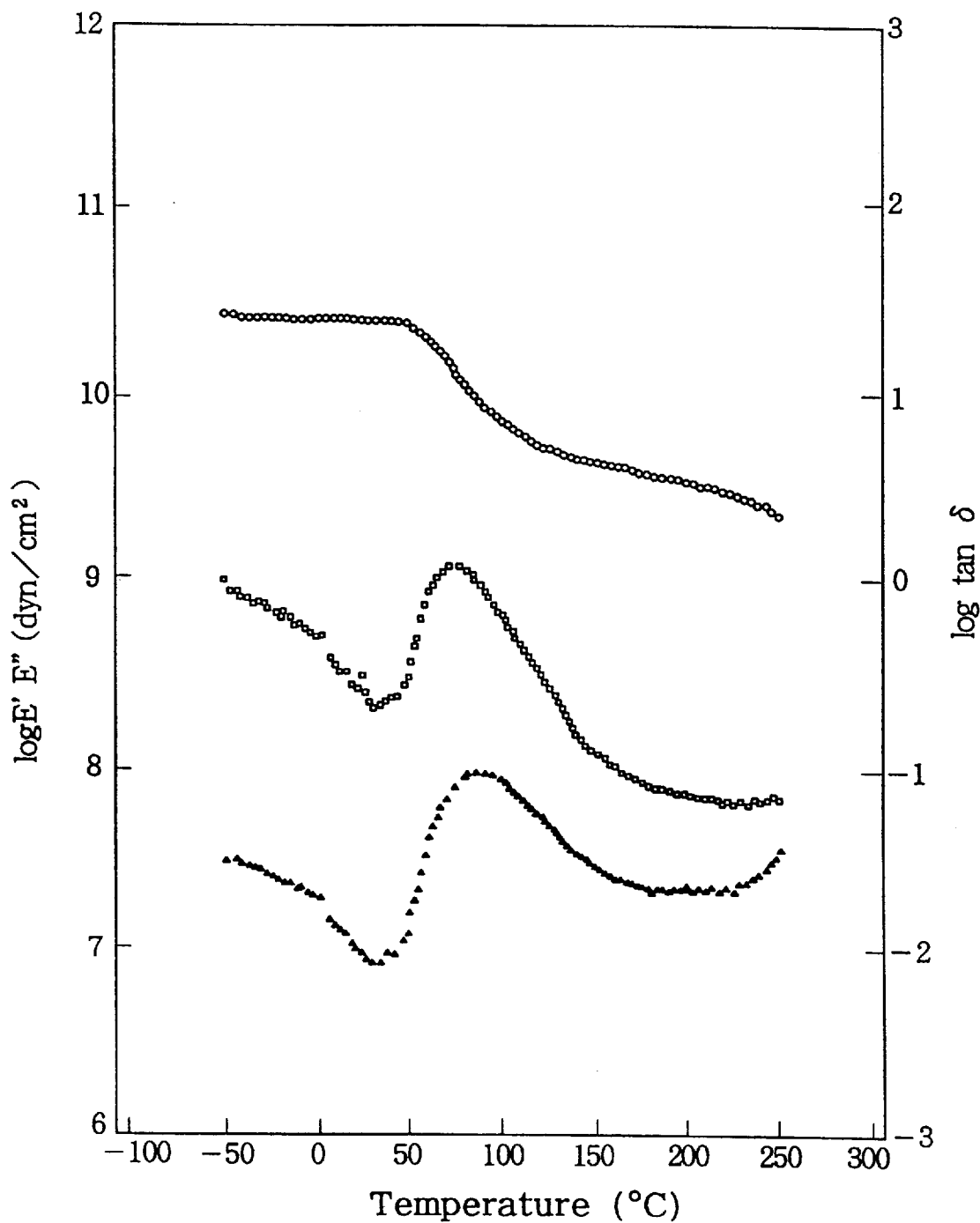
FIG. 4 is a chart showing the viscoelastic spectra of PA 66 (nylon 66) per se, used in Examples 12 and 13.

70 Parts by weight of nylon 66 (Leona® 1300S manufactured and sold by Asahi Chemical Industry Co., Ltd., Japan) and 30 parts by weight of polymer 8 were dry blended, and mixed in a Brabender at 300° C. to thereby obtain a resin composition. The obtained resin composition was molded using a compression molding machine which had been heated to 300° C. The viscoelasticity spectra of the obtained resin composition were measured. Results are shown in FIG. 3.

With respect to a change in a loss factor (tan δ) (criterion for dynamic viscoelasticity) on the higher temperature side, it is confirmed that the resin composition of Example 13 shows a peak at a considerably high temperature, as compared to the resin composition of Example 12.

INDUSTRIAL APPLICABILITY

The molecular structure of the polymer (α), which is contained in the novel resin composition of the present invention and which is selected from a non-modified cyclic monomer unit-containing polymer and a modified cyclic monomer unit-containing polymer, wherein the cyclic monomer unit is derived from a cyclic conjugated diene, can be controlled with large freedom. Therefore, by combining the polymer (α) with a polymer (β) other than the polymer (β), a resin composition which is excellent in various properties, such as theremal stability with respect to rigidity, and impact resistance can be provided with large freedom with respect to the choice of its properties.

If desired, the resin composition of the present invention can be mixed with an inorganic reinforcing material. The resin composition of the present invention can be advantageously used as industrial materials, such as a plastic, an elastomer, a fiber, a sheet, a film, machinery parts, a container, a packaging material, a tire, a belt, an insulating material, an adhesive and the like, in various application fields, such as those for automobile parts (an engine cover, an ornament cover, a wheel cover, a fender, a shield cover, an oil pan, an under cover, a spoiler, a carburetor, a seat belt, a gear, a cam, a gas cap, a canister, a manifold, a cooling fan, an instrument panel, a roof, inner parts and the like), electric and electronic parts (a connector, a socket, a substrate, housings, such as a television housing, a telephone housing, a transformer housing and a computer housing, a lens, an organic glass, a switchsocket, a lamp reflector, a coil bobbin, a relay board, a flyback transformer and the like), railroad parts, aircraft parts, clothes, medical equipment parts, packaging materials for drugs and foods, separating membranes, resins for exchange membranes, printed circuit boards, and general miscellaneous goods.

We claim:

1. A resin composition comprising:

(α) at least one polymer selected from the group consisting of a non-modified cyclic monomer unit-containing polymer (1) and a modified cyclic monomer unit-containing polymer (1'), said polymer (1) and said polymer (1') being, respectively, represented by the following formulae (1) and (1'):

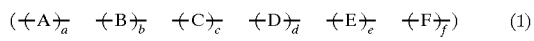

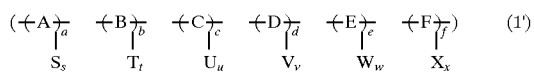

wherein A to F are monomer units constituting a main chain of each of said polymers (1) and (1'), in which monomer units A to F are arranged in any order, and a to f are, respectively, weight percentages of monomer units A to F, based on the total weight of monomer units A to F;

wherein:

A is selected from the group consisting of cyclic olefin monomer units each being independently represented by the following formula (4):

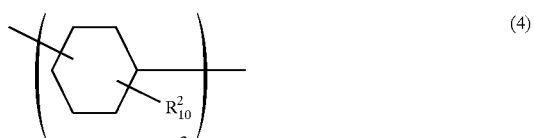

wherein each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, B is selected from the group consisting of cyclic conjugated diene monomer units each being independently represented by the following formula (5):

wherein each $R^2$ is as defined for formula (4), each C is independently selected from the group consisting of chain conjugated diene monomer units, each D is independently selected from the group consisting of vinyl aromatic monomer units, each E is independently selected from the group consisting of polar monomer units, and each F is independently selected from the group consisting of an ethylene monomer unit and α-olefin monomer units;

wherein: a to f satisfy the following requirements:
a+b+c+d+e+f=100,

0≦a, b≦100,
0≦c, d, e, f<100, and
a+b≠0;

wherein each of S to X, which are modifying groups and which are the same or different, is independently a functional group or an organic compound residue containing said functional group, said functional group containing at least one member selected from the group consisting of oxygen, nitrogen, sulfur, silicon, phosphorus and halogen, including fluorine, chlorine, bromine and iodine; and wherein s to x are, respectively, weight percentages of modifying groups S to X, based on the weight of said polymer (1'), and satisfy the following requirements:

0<s+t+u+v+w+x<100, and

0≦s, t, u, v, w, x<100, said polymer (α) having a number average molecular weight of from 10,000 to 5,000,000, provided that when a+b=100, a>0 and b>0 or when 0<a+b<100, said polymer (α) is a block copolymer which contains at least one polymer block containing a contiguous arrangement of at least ten monomer units selected from the group consisting of A monomer units, B monomer units and both of A and B monomer units, and (β) at least one thermoplastic resin which is other than said polymer (α) and is selected from the group consisting of an olefin polymer, a styrene polymer, a conjugated diene polymer, a hydrogenated conjugated diene polymer, an ester polymer, an ether polymer, an amide polymer and a sulfide polymer, said polymer (α) being present in an amount of at least 1% by weight, based on the total weight of said polymer (α) and said polymer (β).

2. The resin composition according to claim 1, wherein, in at least one formula of (1) and (1'), said main chain has a block copolymer configuration, in which said block copolymer has at least one polymer block containing at least one monomer unit selected from the group consisting of said A monomer unit and said B monomer unit.

3. The resin composition according to claim 1, wherein, in at least one formula of (1) and (1'), said main chain has a block copolymer configuration, in which said block copolymer has at least one polymer block consisting of at least one A monomer unit and at least one B monomer unit.

4. The resin composition according to claim 1, wherein, in at least one formula of (1) and (1'), said main chain has a block copolymer configuration, in which said block copolymer has at least one polymer block consisting of A monomer units.

5. The resin composition according to claim 1, wherein, in at least one formula of (1) and (1'), said main chain has a block copolymer configuration, in which said block copolymer has at least one polymer block consisting of B monomer units.

6. The resin composition according to claim 1, wherein each of S to X is independently a functional group or an organic compound residue containing said functional group, said functional group being at least one member selected from the group consisting of a hydroxyl group, an ether group, an epoxy group, a carboxylic acid group, an ester group, a carboxylate group, an acid anhydride group, an acid halide group, an aldehyde group, a carbonyl group, an amino group, an amido group, an imido group, an imino group, an oxazoline group, a hydrazine group, a hydrazido group, an amidine group, a nitrile group, a nitro group, an isocyano group, a cyanato group, an isocyanato group, a silyl group, a silyl ester group, a silyl ether group, a silanol group, a thiol group, a sulfide group, a thiocarboxylic acid group, a dithiocarboxylic acid group, a sulfonic acid group, a sulfinic acid group, a sulfenic acid group, a thiocyanato group, an isothiocyanato group, a thioaldehydo group, a thioketone group, a phosphoric acid group, a phosphonic acid group and a phosphinic acid group.

7. The resin composition according to claim 1, wherein each of S to X is independently a functional group or an organic compound residue containing said functional group, said functional group being at least one member selected from the group consisting of a hydroxyl group, an epoxy group, a carboxylic acid group, an ester group, a carboxylate group, an acid anhydride group, an amino group, an amido group, an imido group, an imino group, an oxazoline group, a hydrazine group, a hydrazido group, an isocyano group, a cyanato group, an isocyanato group, a silyl group, a silyl ester group, a silyl ether group, a silanol group, a thiol group, a sulfide group, a thiocarboxylic acid group and a sulfonic acid group.

8. The resin composition according to claim 1, wherein said polymer (α) comprises said modified cyclic monomer unit-containing polymer (1'), wherein at least one modifying group of S to X is a functional group or an organic compound residue containing said functional group, said functional group being selected from the group consisting of a hydroxyl group, an epoxy group, a carboxylic acid group, an ester group, a carboxylate group, an acid anhydride group, an amino group, an amido group, an imido group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic acid group;

wherein said polymer (β) comprises at least one polymer selected from the group consisting of an ester polymer containing at least one functional group selected from the group consisting of a hydroxyl group, a carboxyl group and an ester group, an ether polymer containing at least one functional group selected from the group consisting of a hydroxyl group and an ether group, an amide polymer containing at least one functional group selected from the group consisting of an amino group, a carboxyl group and an amido group, and a sulfide polymer containing at least one functional group selected from the group consisting of a thiol group and a sulfide group; and wherein said resin composition comprises 0.001 to 100% by weight, based on the weight of said resin composition, of a reaction product of the polymer (α) with the polymer (β), wherein said reaction product is formed by the reaction of said at least one functional group or organic compound residue of the polymer (α) with said at least one functional group of the polymer (β).

9. The resin composition according to claim 1, wherein said polymer (α) comprises said modified cyclic monomer unit-containing polymer (1'), wherein at least one modifying group of S to X is a functional group or an organic compound residue containing said functional group, said functional group being selected from the group consisting of a hydroxyl group, an epoxy group, a carboxylic acid group, an ester group, a carboxylate group, an acid anhydride group, an amino group, an amido group, an imido group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic acid group;

wherein said polymer (β) comprises at least one modified polymer selected from the group consisting of a modified olefin polymer, a modified styrene polymer, a modified conjugated diene polymer, a modified hydrogenated conjugated diene polymer, a modified ether polymer and a modified sulfide polymer, said at least one modified polymer having at least one functional group or organic compound residue containing said functional group, wherein said functional group is selected from the group consisting of a hydroxyl group, an epoxy group, a carboxylic acid group, an ester group, a carboxylate group, an acid anhydride group, an amino group, an amido group, an imido group, an imino group, an oxazoline group, an isocyano group, a cyanato group, an isocyanato group, a silyl ester group, a silyl ether group, a silanol group, a thiol group, a sulfide group, a thiocarboxylic acid group and a sulfonic acid group; and wherein said resin composition comprises 0.001 to 100% by weight, based on the weight of said resin composition, of a reaction product of the polymer (α) with the polymer (β), wherein said reaction product is formed by the reaction of said at least one functional group or organic compound residue of the polymer (α) with said at least one functional group or organic compound residue of the polymer (β).

10. The resin composition according to claim 1, wherein said thermoplastic resin (β) is an olefin polymer having an intrinsic viscosity of from 0.1 to 100 (liter/g) as measured at 135° C. in decalin.

11. The resin composition according to claim 1, wherein said thermoplastic resin (β) is an amide polymer having an intrinsic viscosity of from 0.1 to 100 (liter/g) as measured at 25° C. in 96% $H_2SO_4$.

12. The resin composition according to claim 1, wherein said thermoplastic resin (β) is at least one olefin polymer selected from the group consisting of an ethylene homopolymer, an α-olefin homopolymer and a copolymer of ethylene with an α-olefin.

13. The resin composition according to claim 1, wherein said thermoplastic resin (β) is a crystalline polyamide which is obtained by polymerizing at least one member selected from the group consisting of a reaction product of a diamine with a dicarboxylic acid, a lactam and an amino acid.

* * * * *